(12) United States Patent
Lukaszewski et al.

(10) Patent No.: US 12,386,329 B2
(45) Date of Patent: Aug. 12, 2025

(54) AUTOMATIC DETERMINATION OF INDOOR OR OUTDOOR ENVIRONMENTAL CONDITIONS OF A DEVICE

(71) Applicant: HEWLETT PACKARD ENTERPRISE DEVELOPMENT LP, Spring, TX (US)

(72) Inventors: Charles Lukaszewski, Santa Clara, CA (US); Stuart Walker Strickland, Santa Clara, CA (US)

(73) Assignee: Hewlett Packard Enterprise Development LP, Spring, TX (US)

( * ) Notice: Subject to any disclaimer, the term of this patent is extended or adjusted under 35 U.S.C. 154(b) by 0 days.

(21) Appl. No.: 18/666,430

(22) Filed: May 16, 2024

(65) Prior Publication Data

US 2024/0310803 A1    Sep. 19, 2024

Related U.S. Application Data

(63) Continuation of application No. 17/839,276, filed on Jun. 13, 2022, now Pat. No. 12,019,416.

(51) Int. Cl.
*G05B 19/042* (2006.01)
*G01S 19/48* (2010.01)
*G08C 19/00* (2006.01)

(52) U.S. Cl.
CPC ........... *G05B 19/042* (2013.01); *G01S 19/48* (2013.01); *G08C 19/00* (2013.01); *G05B 2219/2642* (2013.01)

(58) Field of Classification Search
CPC .......... G05B 19/042; G05B 2219/2642; G01S 19/48; G08C 19/00
USPC ........................................................ 340/3.1
See application file for complete search history.

(56) References Cited

U.S. PATENT DOCUMENTS

| | | |
|---|---|---|
| 8,751,151 B2 | 6/2014 | Funk et al. |
| 9,255,983 B2 | 2/2016 | Thaker |
| 9,326,104 B2 | 4/2016 | Chen et al. |
| 9,706,364 B2 | 7/2017 | Kay et al. |
| 9,759,561 B2 | 9/2017 | Young et al. |
| 9,903,755 B2 | 2/2018 | Albadawi et al. |
| 10,325,354 B2 | 6/2019 | Noyes et al. |
| 10,979,854 B2 | 4/2021 | Kong et al. |
| 11,049,069 B2 | 6/2021 | Huberman et al. |
| 2014/0004876 A1 | 1/2014 | Fuller et al. |
| 2014/0114568 A1 | 4/2014 | Park |
| 2016/0128158 A1* | 5/2016 | Harder .................. H05B 47/11 315/308 |
| 2019/0120806 A1 | 4/2019 | Yan et al. |
| 2019/0385452 A1 | 12/2019 | Nangeroni et al. |

(Continued)

FOREIGN PATENT DOCUMENTS

| | | |
|---|---|---|
| CN | 103513227 A | 1/2014 |
| CN | 104737030 A | 6/2015 |

(Continued)

*Primary Examiner* — Kam Wan Ma
(74) *Attorney, Agent, or Firm* — Hewlett Packard Enterprise Patent Department

(57) ABSTRACT

Systems and methods are provided for deterministically estimating whether the location of a computing device that is fixed or mobile is inside a fully enclosed building or not (e.g., fully or partially indoors/outdoors). Various environments are supported by the substance of the disclosure, including fully or partially indoor and outdoor environments.

20 Claims, 15 Drawing Sheets

(56) References Cited

U.S. PATENT DOCUMENTS

| | | | |
|---|---|---|---|
| 2020/0293753 A1* | 9/2020 | Sehgal | H04L 63/0861 |
| 2022/0128399 A1* | 4/2022 | Xu | G01J 5/60 |
| 2023/0322259 A1* | 10/2023 | Sadek | G01C 21/32 |
| | | | 701/23 |
| 2023/0370831 A1 | 11/2023 | Cheekatla et al. | |

FOREIGN PATENT DOCUMENTS

| | | |
|---|---|---|
| CN | 113176587 A | 7/2021 |
| WO | 2017/048415 A1 | 3/2017 |

* cited by examiner

AUTOMATIC DETERMINATION OF INDOOR OR OUTDOOR ENVIRONMENTAL CONDITIONS OF A DEVICE

CROSS REFERENCE TO RELATED APPLICATIONS

This application is a continuation of, and claims the priority benefit of, U.S. patent application Ser. No. 17/839,276, filed on Jun. 13, 2022, now U.S. Pat. No. 12,019,416, the contents of which are incorporated herein by reference in their entirety.

BACKGROUND

Today's wireless devices are able to perform many tasks that were impossible to perform by devices in existing computing environments. Advancements in technology have given both fixed and mobile devices the ability to detect their location using a Global Navigation Satellite Systems (GNSS) or, for example, the ability to directly identify and quantify other phenomena in the local environment in order to customize functions of the device such as brightening or darkening a display in response to ambient lighting conditions. However, it is increasingly necessary for devices to make decisions based on environmental states that cannot be directly measured. One example is whether a device is indoors or outdoors, including the situation where a device may be physically "inside" a building or structure of some kind but should be considered, for certain purposes, environmentally "outside" due to an open atrium ceiling, open windows, open hangar doors and the like. Knowledge of this state with high confidence could be used to determine, for example, whether certain radio frequency bands may be used by the device to transmit data, where a government regulator has imposed limitations based on whether a device is indoors or outdoors. An automobile in a garage with the door closed could automatically shut off the gasoline engine to prevent accidental carbon monoxide poisoning, and so on.

BRIEF DESCRIPTION OF THE DRAWINGS

The present disclosure, in accordance with one or more various embodiments, is described in detail with reference to the following figures. The figures are provided for purposes of illustration only and merely depict typical or example embodiments.

Figure 1:
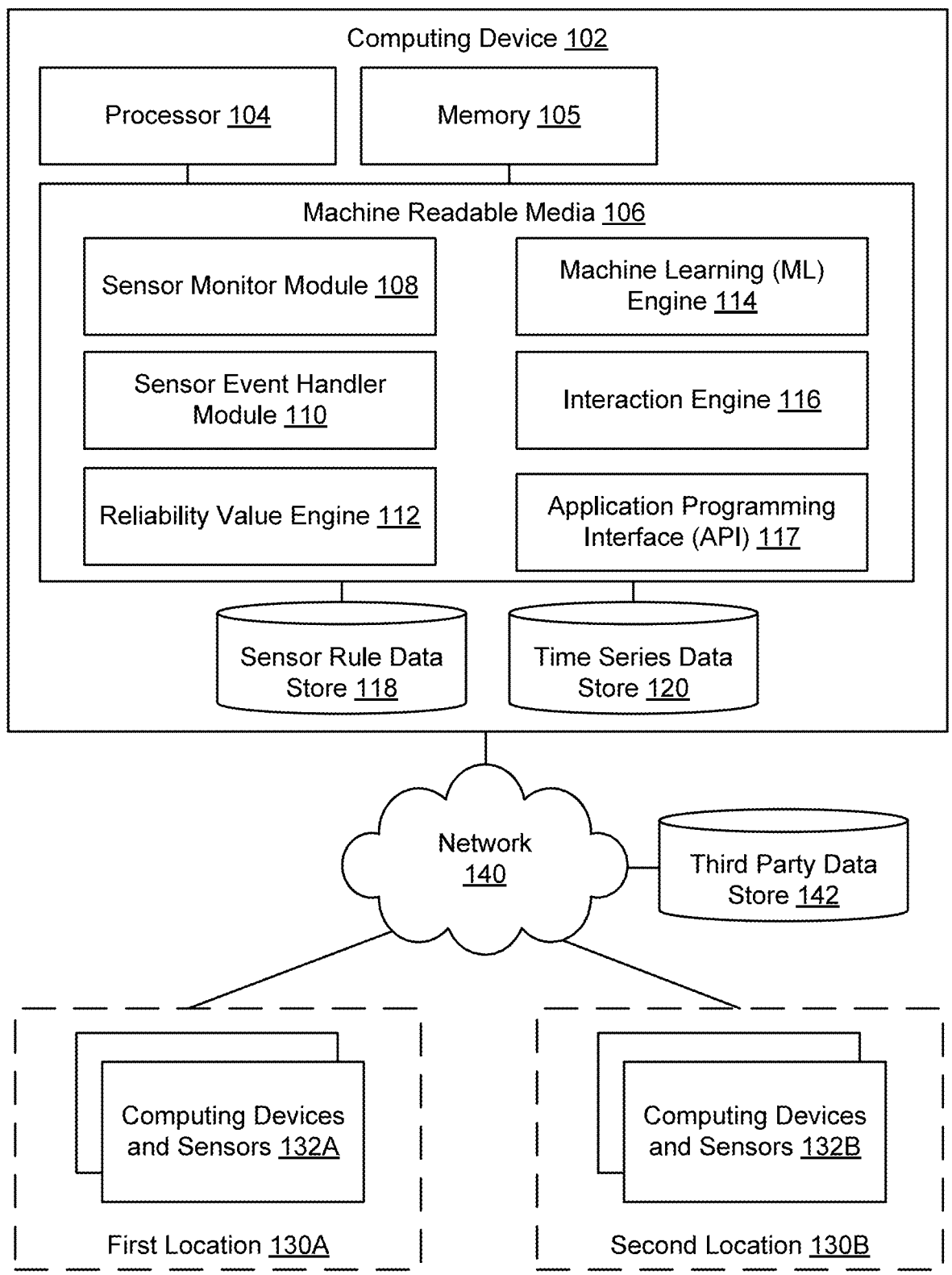
FIG. 1 illustrates a computing device for determining environmental conditions of a device's environment, in accordance with some examples of the disclosure.

The figures are not exhaustive and do not limit the present disclosure to the precise form disclosed.

DETAILED DESCRIPTION

Several existing systems attempt to infer the indoor or outdoor environment of a computing device by relying upon a combination of device location estimates and/or 2D map data to estimate whether the location of the device corresponds to a location on the map (e.g., an indoor location of a building or other environmental location). For example, these existing systems may supplement Global Navigation Satellite Systems (GNSS) data with sensor data to determine the geolocation of the computing device. Some systems may also compare this estimated geolocation with a 2D map and determine more information about the environment that is represented in the map. In this manner, existing systems may attempt to determine whether the computing device is contained within a building footprint with a combination of GNSS, sensor data, and map data. However, such attempted inferences cannot reliably reveal whether the device is actually in an indoor or outdoor environment when, for example, a car is parked in a multi-story above ground ramp with open walls and rooftop parking or a user is standing well inside an open balcony door. There are many situations where such a device would be considered outdoors. For instance U.S. radio regulations in the 6 GHz frequency band explicitly prohibit any form of transmission directly into the outdoors, including specifically devices that might be physically inside a building footprint but are nonetheless directly exposed to outdoor conditions.

Existing indoor or outdoor environmental detection systems become less and less accurate when the computing device is in motion. This may be based on the data processing capabilities of the mobile computing device taking longer for environmental sensors to establish the indoor or outdoor state than it does for geolocation, which may be determined in real time with modern equipment. For example, using the GNSS data as the computing device moves from one environment to another, the location of the computing device may be estimated at a particular point in time with high spatial and temporal accuracy but, since sensors important to indoor detection like temperature, humidity, illumination intensity, illumination spectral signature and/or broadcast radio signals may take several minutes to many hours to reach a high-confidence estimate of the environment, the environmental detection on mobile platforms may not be able to achieve the level of statistical confidence available to fixed devices with equivalent sensor capabilities.

Embodiments of the application can deterministically estimate whether the location of a computing device that is fixed or movable is inside a fully enclosed building or not (e.g., fully or partially indoors/outdoors). The determination of the environment at the fixed or movable location may be required within a specified timeframe (e.g., 4, 12, or 24 hours) to reach a minimum desired confidence level for a given use case (e.g., 95% confidence score from a trained machine learning model), although specific time and accuracy limitations are not necessary in all embodiments. For the case of moving devices it may be that a low or moderate confidence is the best that can be expected, with the potential maximum confidence limit being inversely proportional to the velocity of the device. Since velocity itself can be determined with widely-available and low-cost sensors this adjustment to confidence levels as compared with the fixed case can be calculated by the examples discussed throughout the disclosure.

Various environments are supported by the substance of the disclosure, including fully or partially indoor and outdoor environments. For example, a first set of computing devices and sensors may be placed fully indoors of a building fixed at a first location and a second set of computing devices and sensors may be placed fully outdoors adjacent to the building fixed at a second location. The locations may be inside and outside of a building that has movable components, like a roof (e.g., a professional sports stadium that opens and closes based on local weather conditions), sliding doors or walls (e.g., an airplane hangar or warehouse with a movable wall to allow easy access for vehicle ingress and egress), or other structure types. When the structure is fully contained (e.g., the roof, sliding doors, or walls are closed), the computing devices and sensors may detect typical environmental conditions and sensor data associated with a controlled indoor environment. Comparatively, the computing devices and sensors may detect an outdoor environment when the environmental conditions of the building have changed (e.g., when the movable roof or the sliding doors are open). In these instances, the computing devices and sensors may remain fixed but the environment around these devices has changed. In these examples, the computing devices and sensors may detect the changing or current environment.

As defined herein, "fully indoors" may correspond with a computing device or sensor that is inside of a constructed structure. The structure may have walls on all sides, some type of engineered floor system, and/or a roof structure sufficient to protect against most weather conditions. The structure may have doors and windows that open from time to time, where the aperture of the openings is small relative to the size of the structure. The doors and windows may be assumed to be generally closed for security, climate control, or other reasons. A widely understood purpose of such structures is to provide a controlled environment for occupants that is measurably different than ambient "outdoor" conditions. For this reason, a car parked in a parking structure with a multi-story concrete ramp, where the parking structure is open to the elements may not be considered "fully indoors" even though the computing device or sensor that is temporarily located inside the parking structure may be contained inside the physical footprint of the parking structure as shown on a map or a building database.

The fully indoor structure may be either permanent or temporary. When the structure is temporary, it may be engineered to be generally closed to the outside as described above. As an illustrative example, the fully indoors structure may correspond with a large climate-controlled tent. For example, the tent can be used in various situations, including to host large groups of people during a sporting event that is erected by a crew and then disassembled at the end of the event. However, a camping tent may not meet the spirit of being fully indoors, which might have flimsy walls, a constantly-open window or door entryway, breathable fabric that does not resist moisture, and the like rendering it difficult to accurately determine an environmental difference with full outdoor conditions.

As defined herein, "fully or partially outdoors" may correspond with a computing device or sensor that is outside of a constructed and enclosed structure or any location that is not "fully indoors," as defined above. For example, locations inside permanent structures that are directly exposed to outdoor conditions on one or more sides during normal hours of operation are "fully outdoors." Illustrative examples may include, an automotive car shop with rolling doors that are normally in the "up" position during working hours, an aircraft hangar, or stadium skyboxes that are normally are open to the field/court/pitch during a match (where the stadium itself is open to the elements).

In some examples, from an algorithmic perspective, any device with an estimated probability (including confidence value) of being indoors that falls below some defined threshold specific to a particular use case may be considered outdoors. In some examples, a device whose estimated probability (including confidence value) of being outdoors is above some defined threshold may be considered outdoors, regardless of the indoor probability.

Even with these illustrative examples, computing devices and sensors may also be "partially indoors or outdoors" in various environments. For example, the computing device may be partially indoors when the roof or large sliding door is half-way open. The system (e.g., located remotely from the environment that a computing device or sensor is located) can receive sensor data from the computing device or sensors in the environment and can estimate or derive the probabilities that the computing device or sensors are fully indoors, fully outdoors, or partially indoors or outdoors.

The disclosed system can identify these and other environments of the computing device using sensor data analytics, as described throughout the disclosure, based on simple if/then/else threshold comparisons, pattern or signature recognition based on curve fitting or other techniques, linear programming, or a trained machine learning (ML) model. Any of these approaches can determine a confidence value corresponding with the environment of the computing device and whether to recalculate the location and confidence value upon movement of the device or an adjustment of the environment (e.g., moving roof, changing walls, etc.) in real-time. Data from various sensor types can be generated, including but not limited to radio signal receivers, timers and clocks, pressure, air particulates and trace gasses, radiological, inertial, vibration (e.g. piezoelectric), optical, acoustic, electrical, or magnetic sensors that are embedded or communicatively associated with the computing device or the surrounding environment. In some examples, a plurality of devices can provide sensor data to a remote device or system to determine the environment of each of the plurality of devices. The estimated environment and confidence value can be published to other systems in order to, for example, enable home automation devices or automatically tune adjacent devices based on the determined environment.

Technical improvements are realized throughout the disclosure. For example, the disclosed system can more accurately detect the environment of the computing device and sensors, which can create more accurate data processing. Additionally, the use of the more accurate data and environmental determinations can be implemented in external systems to improve home automation tasks, adjusting image parameters in a security system, altering radio emissions to comply with applicable rules based on open or closed environments, reporting patterns of changes over time in the environment, or other automated processes that may rely on determining characteristics of the environment.

FIG. 1 illustrates a computing device for determining an environmental state of a device, in accordance with some examples of the disclosure. In computing device 102, processor 104, memory 105, and machine readable media 106 are provided. Computing device 102 may be in communication with one or more locations 130 comprising a set of computing devices and sensors 132 via network 140. In some examples, network 140 is an internal network (e.g., LAN or WAN), public internet, or public cloud computing environment.

Processor 104 may be one or more central processing units (CPUs), semiconductor-based microprocessors, containers, virtual machines, and/or other hardware devices suitable for retrieval and execution of instructions stored in computer readable media 106. Processor 104 may fetch, decode, and execute instructions to control processes or operations for creating and implementing the described analytics algorithm(s) and/or trained ML model(s). As an alternative or in addition to retrieving and executing instructions, processor 104 may include one or more electronic circuits that include electronic components for performing the functionality of one or more instructions, such as a graphics processor unit (GPU), field programmable gate array (FPGA), application specific integrated circuit (ASIC), or other electronic circuits.

Memory 105 may include a random access memory (RAM), non-volatile RAM (NVRAM), cache, and/or other dynamic storage devices for storing information and instructions to be executed by processor 104. Memory 105 also may be used for storing temporary variables or other intermediate information during execution of instructions to be executed by processor 104. Such instructions, when stored in computer readable media 106 accessible to processor 104, rendering computing device 102 into a special-purpose machine that is customized to perform the operations specified in the instructions.

Memory 105 may include a read only memory (ROM) or other static storage device for storing static information and instructions for processor 104. Memory 105 may include a magnetic disk, optical disk, solid state disk (SSD), Non Volatile Memory Express (NVMe) or USB thumb drive (Flash drive), etc. for storing information and instructions. In some examples, the information and instructions may be stored in a plurality of data stores, including sensor rule data store 118 and time series data store 120.

Computer readable media 106 may be any electronic, magnetic, optical, or other physical storage device that contains or stores executable instructions. Computer readable media 106 may be, for example, an Electrically Erasable Programmable Read-Only Memory (EEPROM), a storage device, an optical disc, and the like. In some embodiments, computer readable media 106 may be a non-transitory storage medium, where the term "non-transitory" does not encompass transitory propagating signals. As described in detail below, computer readable media 106 may be encoded with executable instructions implemented with a plurality of modules, circuits, and engines, including sensor monitor module 108, sensor event handler module 110, reliability value engine 112, machine learning (ML) engine 114, and interaction engine 116.

Sensor monitor module 108 is configured to receive sensor data from one or more computing devices and sensors 132 from various locations 130. Sensor data and corresponding time stamp and device identifier that generated the sensor data may be stored in time series data store 120 at computing device 102.

Various sensor data may be received and used to generate one or more sensor rules that are stored in sensor rule data store 118. For example, one rule may be that when a measurement of GNSS received signal level (RSL) is equal to or within a specified range of the expected sea-level power spectral density of approximately -130 dBm/MHz, the confidence value corresponding with "fully outdoors" is set above a defined threshold. In another example, when the GNSS RSL is detectable at significantly less than the expected sea-level value, the outdoor probability is not increased and additional data sources may be evaluated for further disambiguation.

Figure 2:
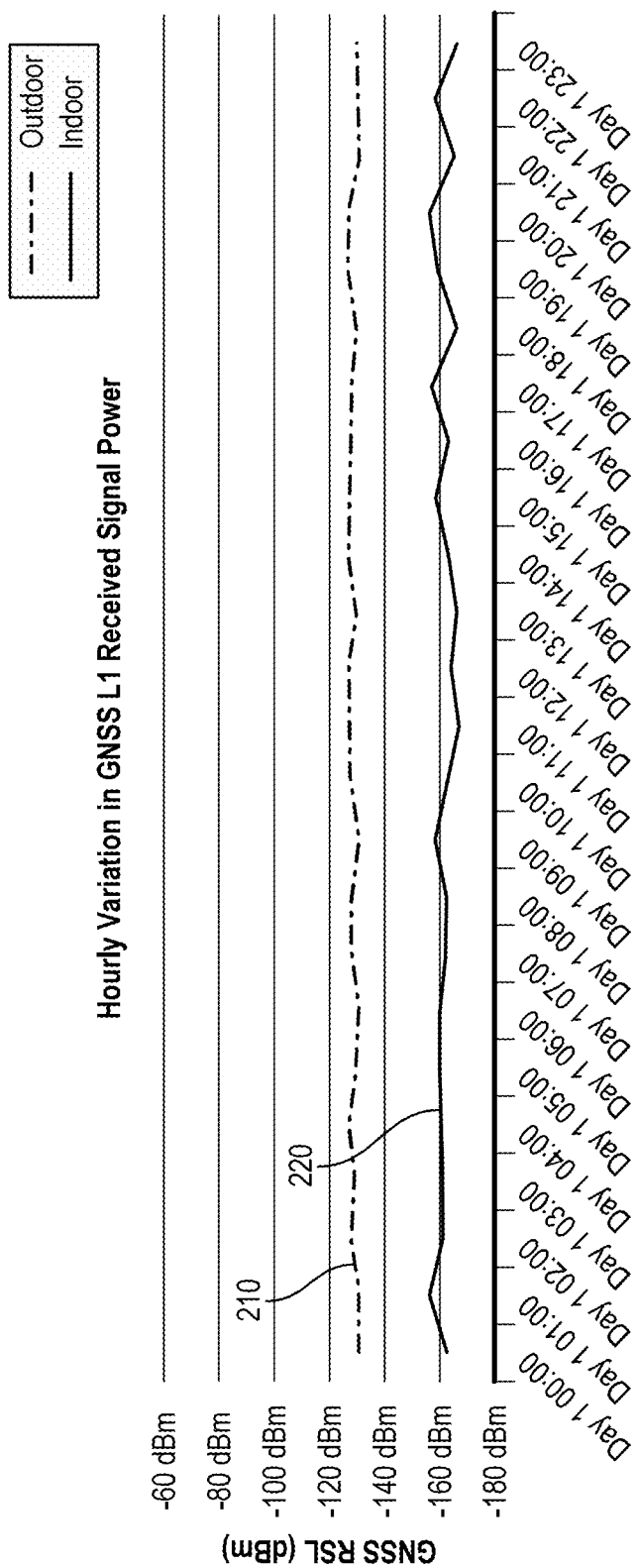
FIG. 2 provides illustrative GNSS RSL measurements.

FIG. 2 provides illustrative GNSS RSL measurements over 24 hours for two receivers, one located outdoors and one located fully indoors. In this example, the receiver 210 that is located in an outdoor environment corresponds with approximately -130 dBm/MHz and the receiver 220 that is located in an indoor environment corresponds with approximately -160 dBm/MHz. The measurable 30 dB drop in signal power is caused by attenuation from the building walls and roof.

In some examples, GNSS RSL measurements can be taken over time in correlation with the orbits of individual satellites. Patterns of appearance and absence over the arc of the orbit can be used to infer whether an absent, attenuated, or reflected signal is transient or persistent, and may represent a temporary or local obstruction, or a more substantial ceiling or wall in the environment where the sensor is located. Since GNSS signals are right-hand circular polarized (RHCP), polarized antennas may be used to determine whether received signals are line-of-sight (LOS) or reflected. These RSL measurements can be used regardless of whether the receiver is able to determine its location.

Figure 8:
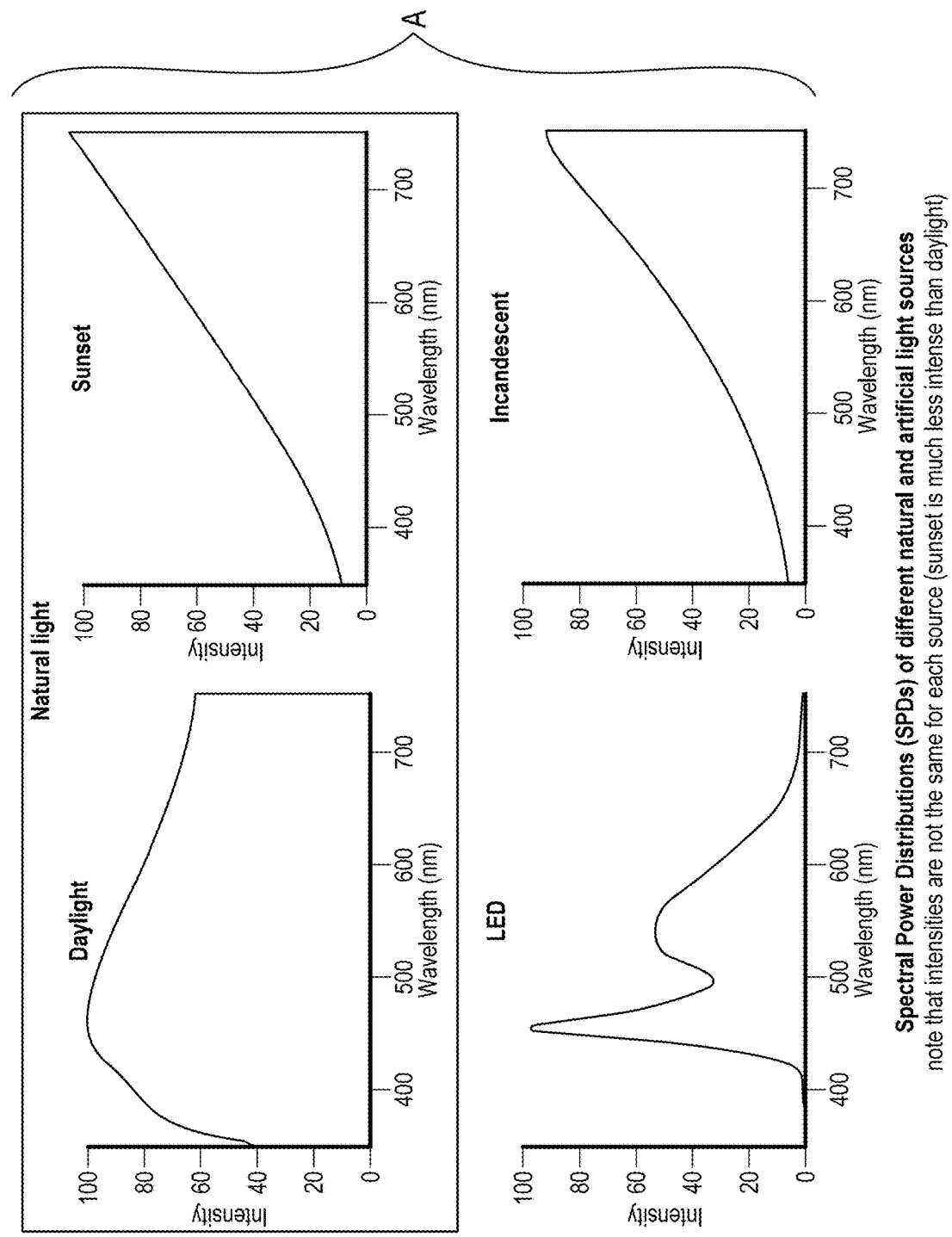
FIG. 8 illustrates light spectrum plots of intensity vs. wavelength that characterize different types of illumination sources, in accordance with some examples of the disclosure.
Figure 8:
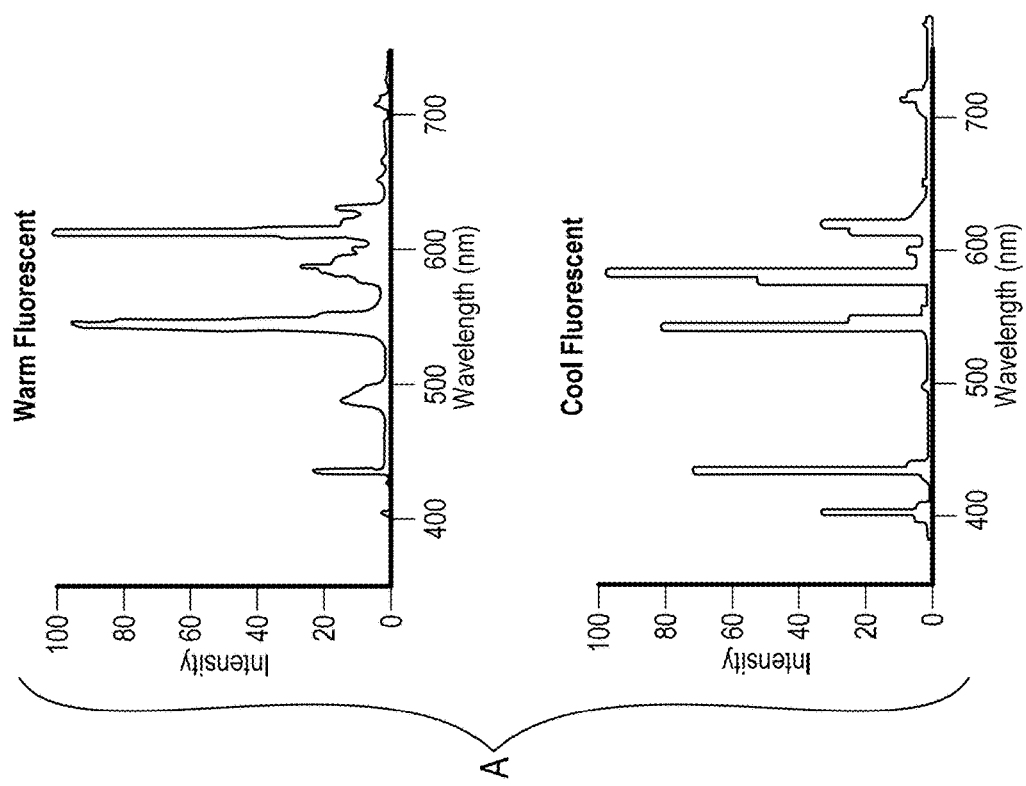

In some examples, the brightness and/or color temperature and/or spectral signature of ambient light detected by the computing device or sensor may correlate with the environment of the device, as illustrated in FIG. 8 and described herein. For example, when the light detected is in a state that differs from what is expected (e.g., dark when day; lit when night), then the sensor rule may raise the confidence value that the device is indoors. Similarly, frequent large changes in illumination or insolation intensity during times of day corresponding with daytime human activity may be associated with a rule where the confidence value associated with the likelihood that the device is indoors may be increased.

In some examples, the temperature patterns may be observed over time. For example, temperature patterns may fall within narrow bands consistent with climate controls for the comfort of living beings in an enclosed space (e.g., indicative of fully indoors environment). Conversely, temperature patterns that vary in a cyclical pattern over a wide amplitude on a diurnal cycle may be consistent with an outdoor area. If this cyclical pattern matches the telemetry from an independent temperature metering station near the device location (determined by GNSS or other means), the confidence value associated with outdoor state may be further increased.

In some examples, humidity patterns monitored by computing device or sensor 132 can be used instead of or in conjunction with temperature. Humidity cycles that are consistent with climate-controlled environments may be banded just as temperature, whereas those of outdoor areas may vary cyclically over 24 hour intervals. Humidity levels tend to move inversely with temperature outdoors and have opposed minima and maxima, permitting a combined rule that may enhance confidence even further than either measurement alone.

In some examples, the presence and fluctuation of oxygen and carbon dioxide levels (or other atmospheric gases) may be consistent with an enclosed space or an open space. For example, the complete absence of air particulates above a certain diameter (e.g. in microns) over an environment may correspond with a rule to increase the confidence value in an assessment of an indoor environment, associated with the presence of an HVAC system. In other examples, the presence of air particulates over an environment may correspond with a rule to increase the confidence value in an assessment of an outdoor environment, associated with the absence of an HVAC system. Such digital particulate size counters may be available from sensors that are embedded with commercial real estate to detect this data.

In some examples, barometric pressure data may correspond with an atmospheric pressure that is materially different than the data readings that are expected in fully outdoor conditions at a particular location. The barometer pressure data may be combined with other data sources to increase the confidence value. For example, repeating measurable pressure changes may be due to mechanical systems (e.g., HVAC) that, over time, may imply the computing device or sensor 132 is in a climate-controlled area. Alternatively, the pressure data may identify that the computing device or sensor 132 is in a sub-basement at an elevation below the local ground level when combined with other sensor data (e.g., the geolocation and a terrain model) or at a much higher elevation than ground level, which may be indicative of the computing device or sensor being located in an upper floor of a building.

In some examples, detection of wireless radio signals may be used as sensor data. For example, a routine channel scan under the IEEE 802 set of local area network technical standards (e.g., Wi-Fi) may show only particular types of computing devices as being present. Based on information signaled in Wi-Fi beacons, the sensor rule may increase the confidence value of the computing device as likely being in an indoor or outdoor environment in correspondence with the type of device detected. For example, 6 GHz frequency band rules require computing devices to identify over the air whether they are in a state corresponding with a "Low Power Indoor" flag or not. In another example, if the expected Received Signal Reference Power (RSRP) of a macro cellular network is known for a particular location and matches what the device measures, it may corroborate an outdoor determination. Various other radio signals may strengthen confidence in a fully outdoor environment, including a near field communication protocol or Bluetooth®, where the observation of a constantly changing succession of devices may indicate an open public space. In some examples, the absence of devices and/or the relative static appearance of a smaller group of devices, may indicate a fully indoor environment and a rule may identify as such. Other public RF broadcasts, including RSL of AM/FM radio stations, RSL of broadcast TV stations, RSL of Low Earth Orbit satellite internet service, or other commonly detectable radios may be determined as well. The presence, absence, or degradation of such signal data may help corroborate the confidence value of computing devices known to be either indoors or outdoors.

In some examples, accelerometer data may be used to augment and improve confidence estimates based on other sensor types. For example, if a velocity value is over a threshold value (e.g., consistent with being in or on a powered vehicle), the confidence value corresponding with the computing device or sensor 132 being fully outdoors may be increased. Alternatively, the accelerometer data may detect vibration patterns or vibration signatures over time that correspond with a motion pattern. In some examples, the accelerometer data that corresponds with motion may trigger a reassessment and calculation of the indoor or outdoor state and confidence values. For some applications and use cases, a computing device being inside an otherwise enclosed and climate controlled vehicle (e.g., a car or a train) may have specific regulatory constraints that preclude some or all operating modes. For example, operating certain electronic devices below 10,000 feet or the 6 GHz frequency band rules prohibiting use in any type of moving vehicle. For a particular use case like this, accelerometer data could be used to disambiguate what might otherwise be a clear environmental signal of indoor conditions to avoid an erroneous result.

In some examples, distance data may be determined from optical (e.g., laser), acoustic, ultrasonic, or other integrated rangefinders capable of measuring distances from a computing device in various directions. The distance may be measured at compass points, around the entire azimuth, and/or vertically to measure wall/floor distance. For example, if a horizontal and vertical distance on all sides is unobstructed, the confidence value may increase as to the computing device or sensor 132 being fully outdoors. In another example, if a horizontal distance on one or more sides is obstructed (e.g., within 20 meters or less), the confidence value may increase as to the computing device or sensor 132 being fully indoors. In another example, if a vertical sensor in the up and/or down direction is obstructed, the confidence value may increase as to the computing device or sensor 132 being fully indoors. In another example, if more than two sides are obstructed and one or two sides are not obstructed, the confidence value may increase as to the computing device or sensor 132 being fully outdoors (e.g., the location 130 may be an aircraft hangar, auto garage, stadium skybox, etc.).

In some examples, compass data may be determined. For example, the detection of magnetic deviation characteristic of indoor environment may be compared to a baseline value of known local magnetic declination.

In some examples, audio or acoustic (used interchangeably) data may be determined (e.g., from a combined speaker microphone computing device). For example, the audio data may identify a frequency response to an impulse signal that corresponds with a room shape or size.

In some examples, radiological data may be determined. For example, a detection and determination of alpha, beta, gamma ray, or neutron signatures may be compared against known indoors or outdoors background levels. Deviation between the two signatures may increase or decrease the confidence value corresponding with the indoor or outdoor environment.

In some examples, third party data from third party data store 142 may be received at computing device 102 (via network 140) and stored with time series data store 120. For example, online information sources may store real time data (e.g., weather data, solar insolation or irradiance, etc.). The third party data may be compared to local sensor readings. The comparison may help reduce the minimum observation period of the sensor data by supplementing patterns and additional data over time.

Additional illustrations of sensor data provided in FIG. 2 are also provided with FIGS. 4-8.

All of this and other data discussed in the disclosure may be received and processed by sensor monitor module 108. For example, sensor monitor module 108 may receive a minimum volume of sensor data for a minimum sampling time. For example, certain sensor types may be capable of making an initial determination that a computing device or sensor 132 is or is not outdoors over very small timescales (e.g., perhaps a few minutes or even a few seconds). In another example, when a GNSS-equipped device cannot recover any signals over a few minutes, then computing device may not be "outside." In general, a minimum threshold of sensor data may be captured to identify patterns over time (e.g., diurnal, weekly, monthly, etc.). In these examples, the initial confidence value may improve by some predictable amount with repetition over time.

Sensor event handler module 110 is configured to receive an event from a computing device or sensor 132 and determine one or more actions to take in response to the received event. For example, the action may be to re-evaluate the predicted environment of the computing device or sensor 132 (e.g., based on movement, delay of time between two sensor readings, an automated trigger to rerun the ML model, etc.). The criteria used to establish indoor or outdoor status of computing device or sensor 132 may be distinct from and/or independent of those used to determine that such a state may have changed and that a re-evaluation is warranted.

Other data types of sensor events in addition to updated motion data, gyroscope data, or GNSS location data may be used to trigger a re-evaluate the predicted environment of the computing device or sensor 132. For example, a loss of power or power cycling of the computing device or sensor 132 may trigger the recalculation. In another example, when the GNSS RSL, solar insolation, or compass data are all undetectable, the computing device or sensor 132 may be fully indoors with a high confidence value. In some examples, patterns in the data may also trigger the recalculation of the predicted environment of the computing device or sensor 132.

Reliability value engine 112 is configured to receive or determine a reliability value associated with a computing device or sensor 132. When determining a value, the sensor data received over time may be tracked. When the amount of time exceeds a threshold value, the particular sensor may correspond with a first reliability value. Over time, the reliability value of the sensor may increase when the sensor provides additional data.

In some examples, reliability value engine 112 may analyze the sensor signals. For example, uniform sensor signals may have a constant amplitude (e.g., plus or minus the value of about 1-2% within the local geographical region). The values may be measured in one location, such as an airport weather station, to help extrapolate to other areas (e.g., within 100 km$^2$ using GNSS signals, local temperature, local humidity, local insolation, barometric pressure, etc.).

In some examples of the disclosure, a machine learning (ML) model may be trained and implemented, although it is not necessary in every embodiment. When a ML model is used, machine learning (ML) engine 114 is configured to analyze sensor data to determine patterns indicative of environmental conditions without training a machine learning model. The use of a trained ML model is not required in every embodiment described herein.

Machine learning (ML) engine 114 is also configured to train an ML model. For example, sensor data may be received to detect a particular environment that corresponds with a fully indoors, fully outdoors, or partially indoors/outdoors environment. The pairs of sensor data and environment may be provided to the ML model during the training process to help detect future, similar environmental data.

Machine learning (ML) engine 114 may determine confidence and value(s) associated with the output of the ML model (e.g., the likelihood that computing devices and sensors 132 are fully or partially indoors/outdoors). For example, the confidence value may identify a ninety percent likelihood that the computing device or sensor 132A at first location 130A and that provided sensor data is located in an environment that is partially outdoors (e.g., the moveable roof on the stadium is open).

In some examples, confidence value corresponding with the likelihood that computing device or sensor 132 is in an indoor or outdoor environment may be increased or decreased based on a reliability value of the a data source generating the sensor data (e.g., corresponding with the origin of the sensor data at the sensor or computing device 132). The confidence value associated with the environment determination may be adjusted to rely more or less on that particular data source. In some examples, the weight and/or reliability value may be decided through an iterative training process for the ML model (e.g., identifying the deterministic relationship between the particular sensor and the determined environment).

ML engine 114 may be configured to execute a supervised ML model using a linear or non-linear function. For example, the trained ML model may comprise a decision tree that accepts the one or more input features associated with the sensor data to provide a confidence score correlating the input to an output (e.g., that the computing device or sensor 132 is located in a particular environment).

In some examples, the ML model may comprise a neural network that measures the relationship between the dependent variable (e.g., logic or action implemented by the device) and independent variables (e.g., the sensor data) by using multiple layers of processing elements that ascertain non-linear relationships and interactions between the independent variables and the dependent variable.

In some examples, the ML model may comprise a Deep Learning Neural Network that consists of more than one layer of processing elements between the input layer and the output later, or a Convolutional Neural Network, in which successive layers of processing elements contain particular hierarchical patterns of connections with the previous layer.

ML engine 114 may determine an output of the ML model, where the output estimates the likelihood that the computing device or sensor 132 is indoors or outdoors. For example, the confidence value may be compared with one or more threshold confidence values that the device is fully indoors (e.g., exceeds 90%) without relying on a reliability of the data generating device or sensor. When the determined confidence value exceeds the first threshold confidence value, the computing device may be determined to be fully indoors. When the confidence value is within a reduced threshold confidence value range (e.g., between 10 and 90%), the computing device may be determined to be partially indoors or outdoors (and any associated reliability value for an individual sensor may be more important to the algorithm or ML model). When the confidence value is less than a second threshold confidence value (e.g., below 10%), the computing device may be determined to be fully outdoors. In other examples, any computing device with an estimated confidence value greater than the threshold confidence value may be considered outdoors, regardless of the indoor probability. These values and ranges are provided for illustrative purposes only and should not be limiting to the disclosure.

In some examples, the threshold confidence value or range of values may be adjusted based on the external system. For example, different applications and use cases may distinguish between indoor and outdoor environments, where the environments are defined more broadly or narrowly, or the confidence values may need to be higher or lower. ML engine 114 may adjust the values by establishing application-specific profiles against which inputs are evaluating in determining and reporting indoor or outdoor status.

In some examples, the determined confidence value may be increased when a number of computing devices or sensors 132 are combined to provide many sources of sensor data over a larger area. This may improve the probability of detection with more sensors, computing devices, and/or external databases. For example, a computing device with two or more sensors (e.g., GNSS, gyroscope, and microphone) can be more certain of its indoor/outdoor confidence than a device with just one sensor (e.g., GNSS). Likewise, a computing device with coarse geoposition awareness and internet access can further improve its confidence and reliability estimates by comparing data from one or more sensors with access to even more data signatures via third party data store(s) 142.

ML engine 114 may transmit the output, the environment states, and confidence values to external systems, including operating system software, user applications, and other electronic programs. In some examples, the transmission may use a Software Development Kit (SDK) Application Programming Interface (API) call, data register, network broadcast or multicast, or other technological means.

Interaction engine 116 is configured to trigger an action in an external system at one or more locations 130. For example, the action may be selected based on the determination whether the computing devices indoors or outdoors (e.g., partially or fully) and, in some examples, the corresponding confidence value determined by the trained ML model.

Various actions in external systems are also described. For example, the action in the external system may activate lighting, water features, or other automated workflows corresponding with a home automation system located at a first location 130A. The characteristics of the sensor data may identify when the computing device 132 moves with the user from inside a home to outside, in which computing device 102 may identify that the user has moved from a fully indoor environment to a fully outdoor environment. The action may correspond with activating the lighting in the outdoor environment that is in communication with computing device 102, in correspondence with this movement.

In another example, the action in the external system may automatically adjust image parameters associated with a security camera (e.g., to turn on a spotlight in a lowlight environment, etc.). In another example, the action in the external system may alter radio emissions settings, open or close doors and windows, start or stop particulate filters in ventilation systems. In another example, detected patterns of fully or partially indoors or outdoors in the external system may be tracked and used to generate a report of a pattern of the environment for historical reporting and analysis purposes. The report may be transmitted to one or more computing devices in the external system or an administrative user. In each of these actions, the computing devices performing the actions may be separate from the computing devices and sensors 132A located at first location 130A that provided the initial sensor data.

In another example, in a regulatory compliance setting, certain regulatory or market requirements may restrict the operation of certain types of computing devices. This may include restricting the computing device 132 from operating in certain modes or require that they follow certain regulations or rules, depending on whether the computing device 132 is located in an indoor or outdoor environment. For example, the 6 GHz and other frequency bands place different and specific limits on radio emissions characteristics based on a device's indoor/outdoor status.

In another example, the external system may be associated with a user's personal health. The computing device or sensor 132 that originates the sensor data may provide the sensor data to a smartphone application that seeks to track characteristics of the environment over time. This may include exposure to untreated air in the environment or measure particulate exposure. The sensor data may not be detected simply by knowing one's physical geolocation (e.g. latitude, longitude, and elevation) but may rely on additional characteristics of the indoor or outdoor environment, as described throughout the disclosure.

In another example, the external system may include enterprise device operation. For devices that can be deployed either indoors or outdoors, the interfaces and other user experience may be adjusted based on the environment. For example, an high-definition (HD) security camera could automatically adjust image parameters to correspond with the outdoor environment. In another example, an audio microphone or sensor may automatically select a particular acoustical configuration based on the determination of characteristics of the environment.

In some examples, computing device 102 may communicate with multiple other computing devices that are connected to a common computing system, either directly or through application programming interface (API) 117. For example, API 117 may help publish the estimated environment and confidence value to other systems by providing a set of functions and procedures allowing the creation of applications that access the features or data of computing device 102. API 117 may be used to, for example, enable home automation devices or automatically tune adjacent devices based on the determined environment. These and other examples discussed throughout the application may be distinct from a public data network and separate from any of the publicly accessible databases. In other words, the illustrative computing environment may be non-limiting to a single device making an indoor/outdoor determination on its own, but may be implemented as multiple devices, each with its own sensors, sharing those sensor data with each other or a central computer system that makes a determination about the environment of one or more of the locations of the other computing devices.

An illustrative example is shown with FIG. 1, where computing device 102 may communicate via network 140 to one or more computing devices or sensors 132 at various locations 120. Network 140 may comprise a connection through local network to a host computer or to data equipment operated by an Internet Service Provider (ISP) and/or the internal networks at a cloud computing provider. The ISP, in turn, provides data communication services through the world wide packet data communication network (e.g., "Internet") to transmit data packets between computing device 102 and computing devices or sensors 132. Network 140 may use electrical, electromagnetic, or optical signals that carry the digital data streams.

Plurality of locations 130 may comprise indoor or outdoor environments. For example, the computing devices and sensors 132A may be placed fully indoors of a building statically located at first location 130A and computing devices and sensors 132B may be placed fully outdoors of the building statically located at second location 130B.

Various environments are supported by the substance of the disclosure. For example, a first location 130A may be internal to a building with a movable roof, including a professional sports stadium. The computing devices and sensors 132A may be technically indoors of the professional sports stadium (e.g. physically on the interior of the building footprint), however made to experience environmental conditions when the movable roof is open that are different from environmental conditions when the movable roof is closed. The computing devices and sensors 132A may remain fixed inside first location 130A but may detect that they are partially outdoors or partially indoors when the movable roof is open and may detect that they are fully indoors when the movable roof is closed. Comparatively, the computing devices and sensors at second location 130B may remain outside of the professional sports stadium and detect no change in their environment while the movable roof is open or closed.

Computing devices and sensors 132 may comprise radio receivers, timers and clocks, pressure, air particulates and trace gasses, radiological, inertial, vibration (e.g. piezoelectric), optical, acoustic, electrical, or magnetic sensors. Computing devices and sensors 132 can be embedded within a computing device or the surrounding environment, including being fixed or mobile, or battery operated or dependent on external sources of power. Each of these computing devices and sensors 132 may contribute to the determination of the indoor/outdoor state of the device and associated confidence value, either alone or in combination with others that are embedded within a computing device or in one or more other computing devices whose indoor/outdoor state may be known or unknown.

Computing devices and sensors 132 may generate various sensor data (e.g., based on the type of sensor). The sensor data may be used individually or in combination with other local or remote sensors or indicators to identify environmental states, correlations, or concurrent or sequential patterns in reported or observed values. For example, the sensor data may comprise absence of expected data (e.g., negative signal), observation of data crossing single or multiple staged thresholds, observation of changes in data over time or aggregated state patterns over recurring intervals (e.g., hour, day, month, year), or observation of changes in data that suggest the device may have moved from a location where its indoor/outdoor state had been previously established.

The sensor data may be synthesized into one or more probabilities expressed as a value with an associated confidence level using computing device 102. When an ML model is implemented in an embodiment of the disclosure, the ML model may assign weights for each type of sensor data input that are correlated and/or convolved in some way. In some examples, the determinations of the environment may be an estimate that the sensor or computing device 132 is in a partial indoor/outdoor environment. Different actions may be triggered based on the determined confidence value and predicted environment.

Figure 3:
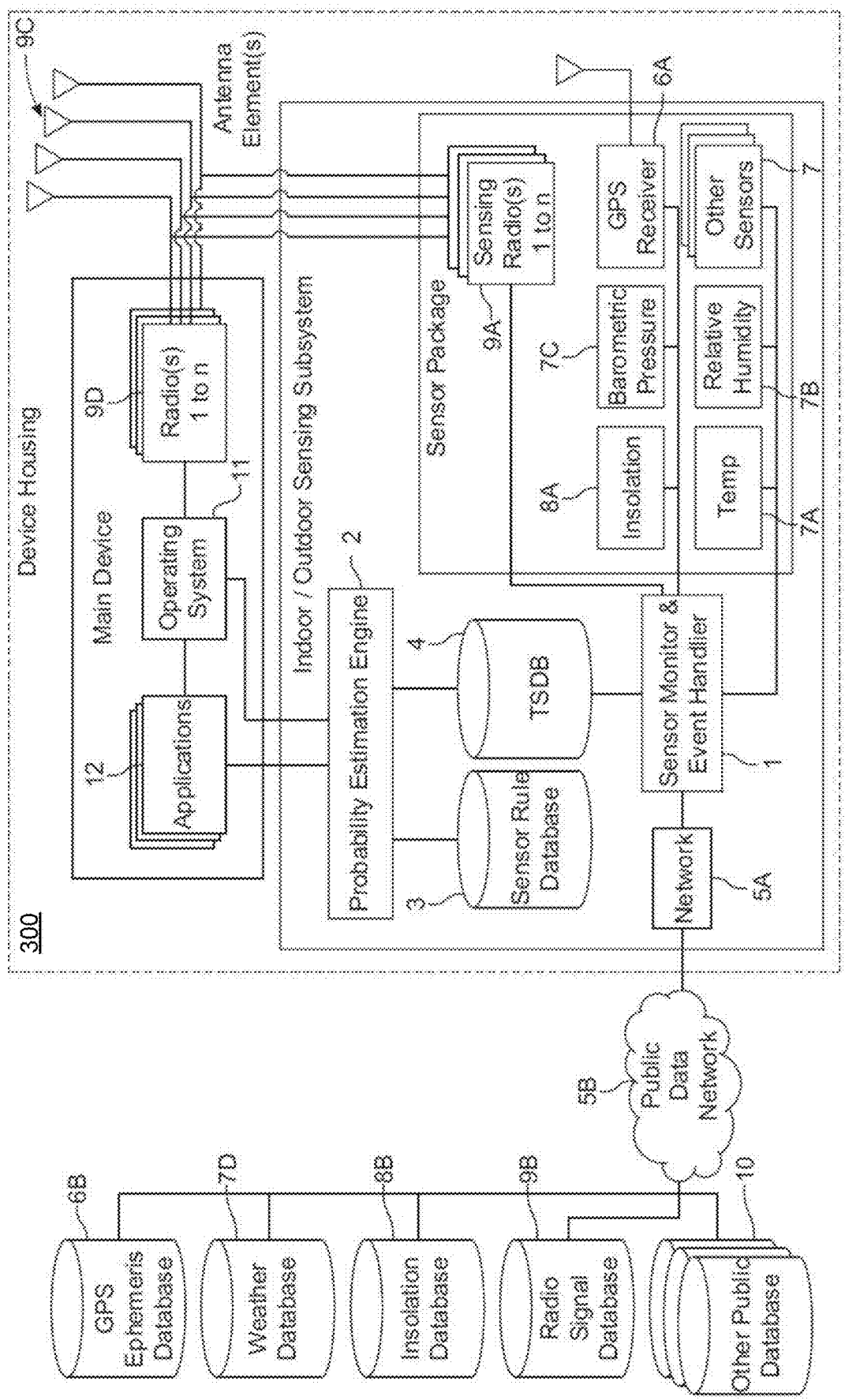
FIG. 3 illustrates a computing device or sensor in the environment, in accordance with some examples of the disclosure.

FIG. 3 illustrates one possible instantiation of the conceptual machine described in FIG. 1, in accordance with some examples of the disclosure. Various sensors are shown for illustrative purposes, but should not limit particular embodiments of the disclosure. Computing device 300 may be similar to computing device 102 illustrated in FIG. 1 when the machine learning and processing is performed remotely from the sensors, or computing device or sensors 132 illustrated in FIG. 1 when the machine learning and/or processing is performed at the device that also collects the sensor data. In some examples, the computing device performing the analytics and determination of the environment of computing devices and sensors 132 illustrated in FIG. 1 may take the form of the computing device 102 illustrated in FIG. 1 or computing device 300 in FIG. 3.

In FIG. 3, computing device 300 comprises sensor monitor & event handler at block 1, probability estimation engine at block 2, sensor rule database at block 3, time series database at block 4, network interface at block 5A, a public data network at block 5B, GNSS receiver at block 6A, GNSS ephemeris public database at block 6B, temperature sensor at block 7A, relative humidity sensor at block 7B, barometric pressure sensor at block 7C, weather public database at block 7D, insolation sensor at block 8A, insolation public database at block 8B, sensing radio complex for inline monitoring at block 9A, radio signal signature public database at block 9B, primary device radio complex at block 9C/9D, other public datasets at block 10, operating system on device at block 11 (e.g., which may comprise machine readable instructions to consume and publish indoor/outdoor state to applications), and other application (s) at block 12 (e.g., which can consume indoor/outdoor state directly or via the OS).

Computing device 300 in FIG. 3 may correlate with computing device 102 in FIG. 1 through various means. For example, sensor monitor module 108 and sensor event handler module 110 in FIG. 1 may be implemented as sensor monitor & event handler at block 1 in FIG. 3. Reliability value engine 112, machine learning (ML) engine 114, and interaction engine 116 in FIG. 1 may be implemented as probability estimation engine at block 2 in FIG. 3. Sensor rule data store 118 in FIG. 1 may be implemented as sensor rule database at block 3 in FIG. 3. Time series data store 120 in FIG. 1 may be implemented as time series database at block 4 in FIG. 3. Network 140 in FIG. 1 may be implemented as public data network at block 5B in FIG. 3. Computing devices or sensors 132 in FIG. 1 may be implemented as one or more of GNSS receiver at block 6A, temperature sensor at block 7A, relative humidity sensor at block 7B, barometric pressure sensor at block 7C, insolation sensor at block 8A, and sensing radio complex for inline monitoring at block 9A in FIG. 3. Third party data store 142 in FIG. 1 may be implemented as one or more of GNSS ephemeris public database at block 6B, weather public database at block 7D, insolation public database at block 8B, radio signal signature public database at block 9B, and other public datasets at block 10 in FIG. 3. Processor 104, memory 105, and machine readable media 106 in FIG. 1 may be implemented as operating system on device at block 11 and other application(s) at block 12 in FIG. 3.

Computing device 300 in FIG. 3 or computing device 102 in FIG. 1 may receive various sensor data. Various sensor data is provided for illustrative purposes in FIGS. 2 and 4-8, and previously discussed with FIG. 1. The illustrative examples may help show the effects of indoor and door environmental measurements on the sensor data over time. The data (e.g., with high-confidence estimates of the indoor vs. outdoor state) may correspond with deviations in a predictable and easily discernable manner in various time periods (e.g., between 12 hours to no more than 24 hours, or one diurnal cycle). These can be converted into recognizable data signatures. In some examples, 4-6 hours may be more than adequate for an algorithm to form a definite prediction of indoor or outdoor state, especially if multiple such sensor feeds are available. As an illustrative example, some signals can reach 95% confidence in half of a diurnal cycle and continued observation beyond 24 hours can improve the confidence further.

Sensor signals may undergo various types of change when observed locally indoors as compared with their outdoor forms, including for example amplitude discontinuity loss, amplitude banding, and time domain banding.

One type of environmental effect is amplitude discontinuity loss. For certain signal types, such as RF transmissions or solar illumination, a building or other structure can significantly reduce or block the signal altogether. This discontinuity may generally be negative, that is, the amplitude of the signal indoors may be less than the amplitude of the measured signal outdoors.

For example, frequency-dependent RF building entry loss may correspond with a range of structure types and may be experienced as a sudden reduction as measured on the inside of the wall of the structure. In some examples, other signals (e.g., acoustic signals or heat) may originate locally and dissipate more quickly in an unenclosed environment (e.g., partially indoors with open ceiling or walls or partially outdoors with thin tent walls). This effect on the inside of the wall of the structure may be typical of the signals that originate in a larger environment or from other local outdoor sources. There may be other signals (such as acoustic signals or heat) that may originate locally and dissipate more quickly in an unenclosed environment. This attenuation effect may affect lower frequencies less than higher ones. A GNSS, AM, FM or television signal may undergo a loss over the discontinuity, as illustrated in FIG. 2. In the visible light spectrum, sunlight may be fully stopped by opaque materials. For glass windows, the overall intensity may be attenuated and such attenuation may be enhanced at certain wavelengths by design (such as to block ultraviolet light).

Figure 7:
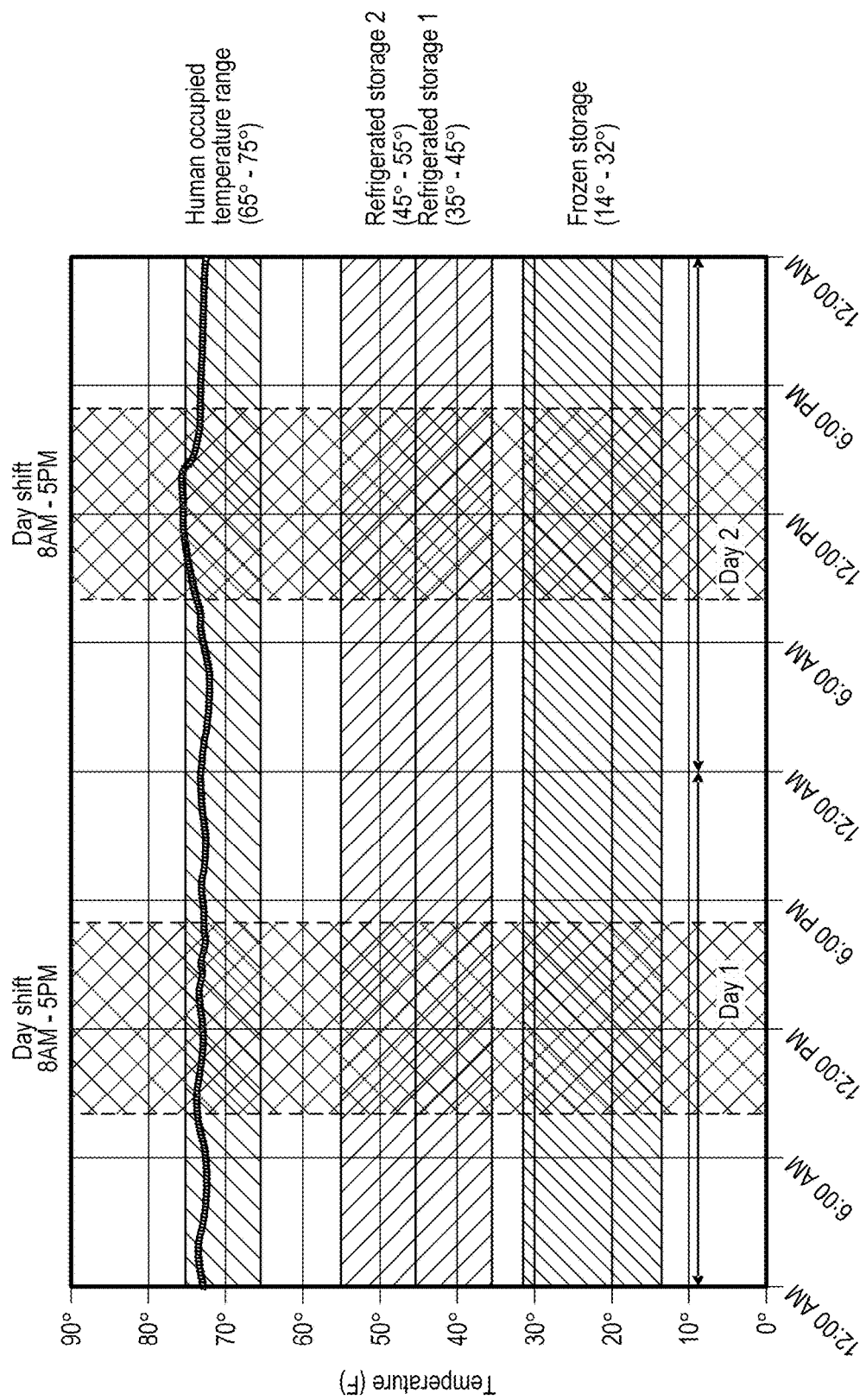
FIG. 7 illustrates environmental sensor data over time, in accordance with some examples of the disclosure.

Another type of environmental effect is amplitude banding, as illustrated by the colored horizontal boxes in FIG. 7. For example, fully enclosed buildings may provide controlled environments for the convenience and productivity of humans residing inside. Therefore, certain signals that may experience wide amplitude swings outdoors may be restricted to be within a fairly narrow band when measured indoors. Temperature and relative humidity are some examples.

Amplitude banding signals may differ from discontinuity loss signals in some respects. For example, the signal may be amplified indoors instead of attenuated, such as an HVAC system raising the temperature on a cold day. Second, the jitter in the amplitude may be confined to a narrow band depending on the function of the area. Some examples include: Indoor temperature for humans (e.g., 65-72 degrees and relative humidity between 30-60%), refrigerated storage (e.g., 35-55 degrees), and relative humidity (e.g., between 60-95% depending on items), and frozen storage (e.g., 14-32 degrees with high relative humidity between 90-95%). As compared with outdoor signals whose value generally "floats" or is unconstrained by these range values, the "banded" values can mean that the measurement is found in a specific expected sub-range. The precise band may be different for every building, but its minimum, maximum, and/or median can be discovered algorithmically (e.g., over a time period like a few days of observation).

Another type of environmental effect is time domain banding, which is also illustrated by the vertical grey boxes in FIG. 7. For example, commercial and residential buildings may have predictable occupancy schedules, which in turn can result in readily-discernable signatures in how sensor signals change over culturally established intervals (e.g., across a 24 hour cycle or 5 day work week). Residential structures may be occupied from late afternoon to early morning, while commercial buildings may support loose or tightly defined work shifts. These repeating patterns can form bands in the time domain.

In some examples, weekly and seasonal banding may also exist for some signals. For instance, commercial properties are often vacant on whatever days are considered the "weekend" in a given country, while conversely residential properties are heavily occupied on such days. On an annual basis, some signal patterns vary with time of year, such as solar irradiance, which varies substantially in both amplitude, onset time, peak time, and duration in the winter as opposed to the summer in each hemisphere. Both of these longer-term measurements can provide additional certainty to the indoor/outdoor estimate confidence.

Figure 4:
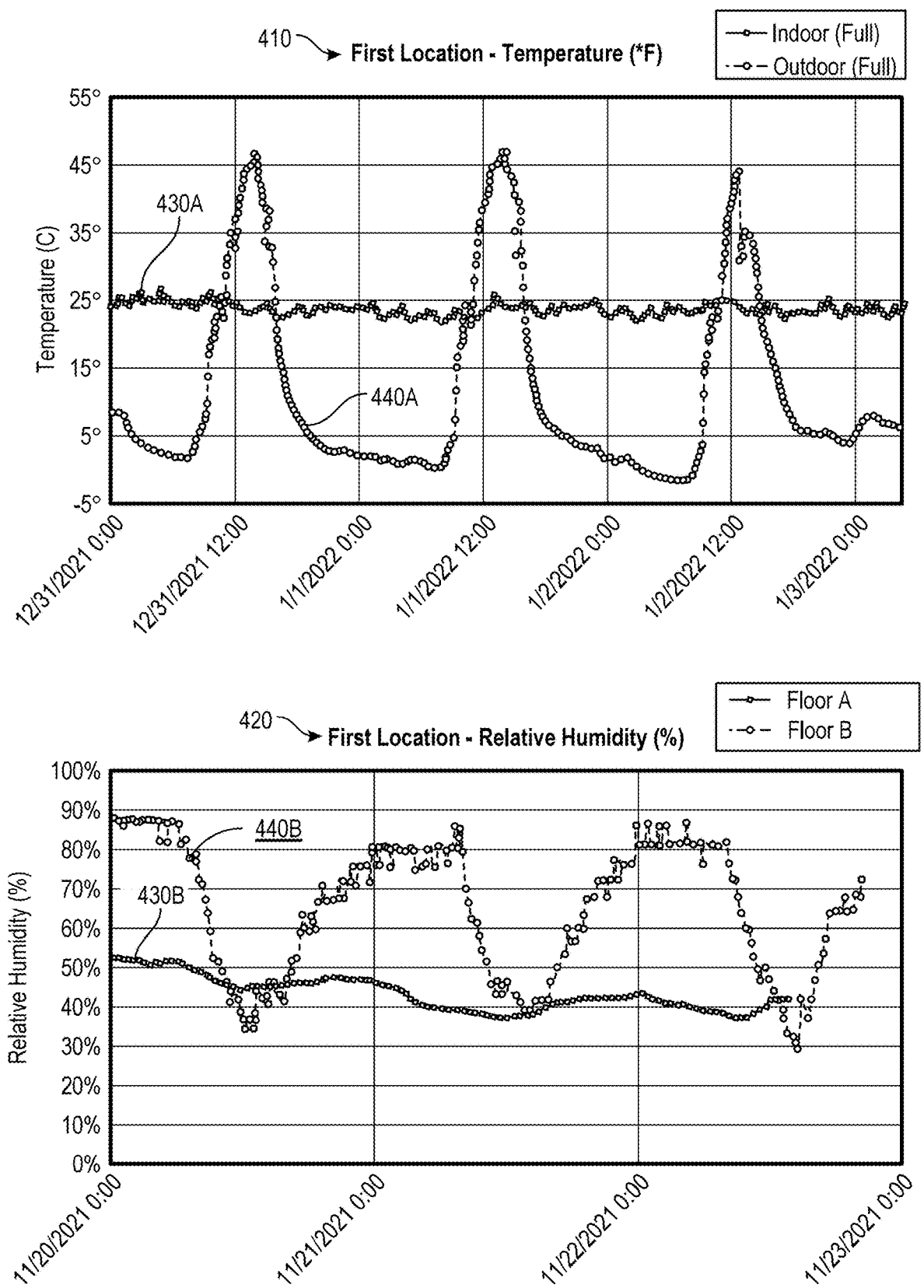
FIG. 4 illustrates environmental sensor data from two different floor levels in a single building over time, in accordance with some examples of the disclosure.
Figure 5:
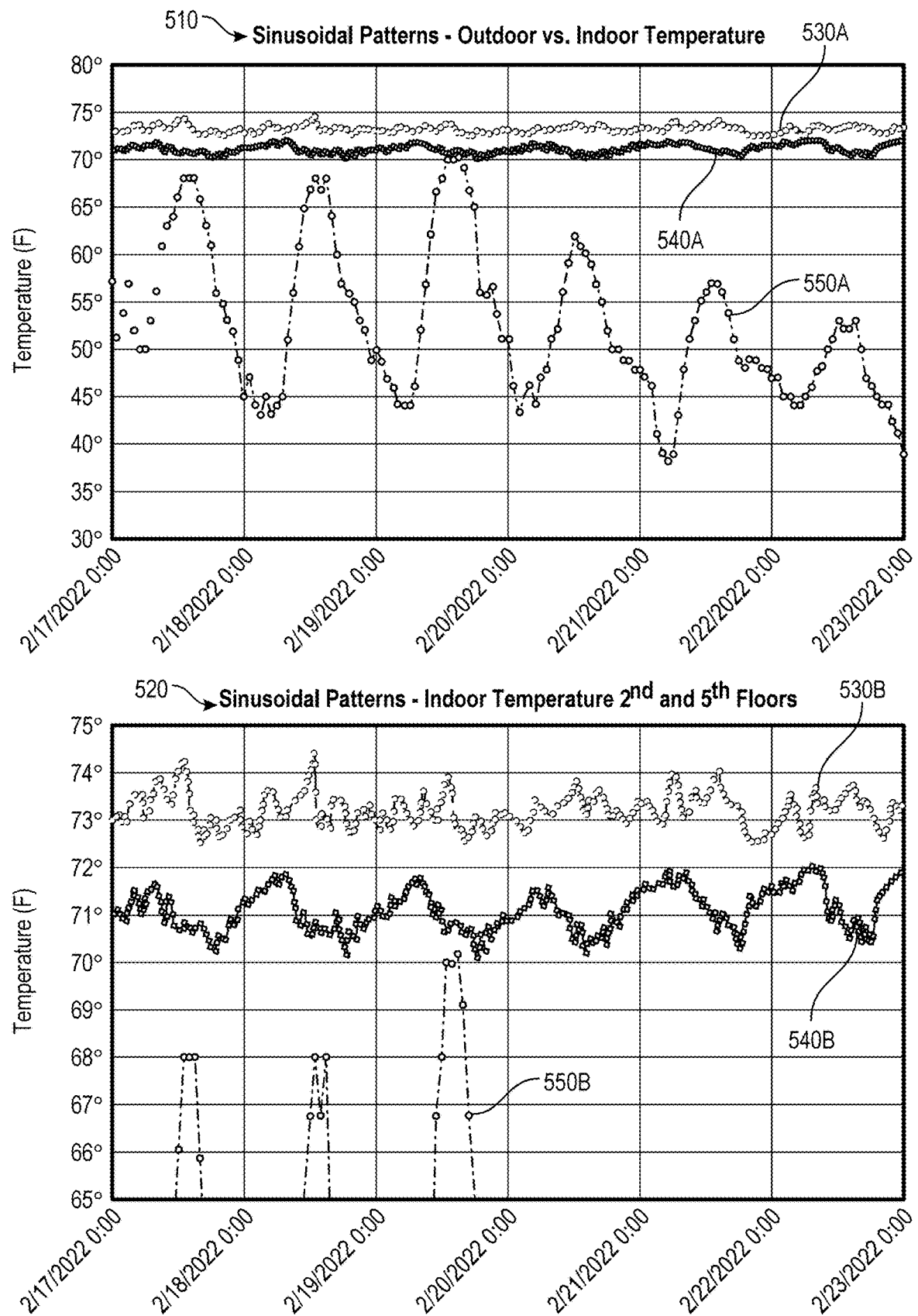
FIG. 5 illustrates environmental sensor data at a second location over time, in accordance with some examples of the disclosure.
Figure 6:
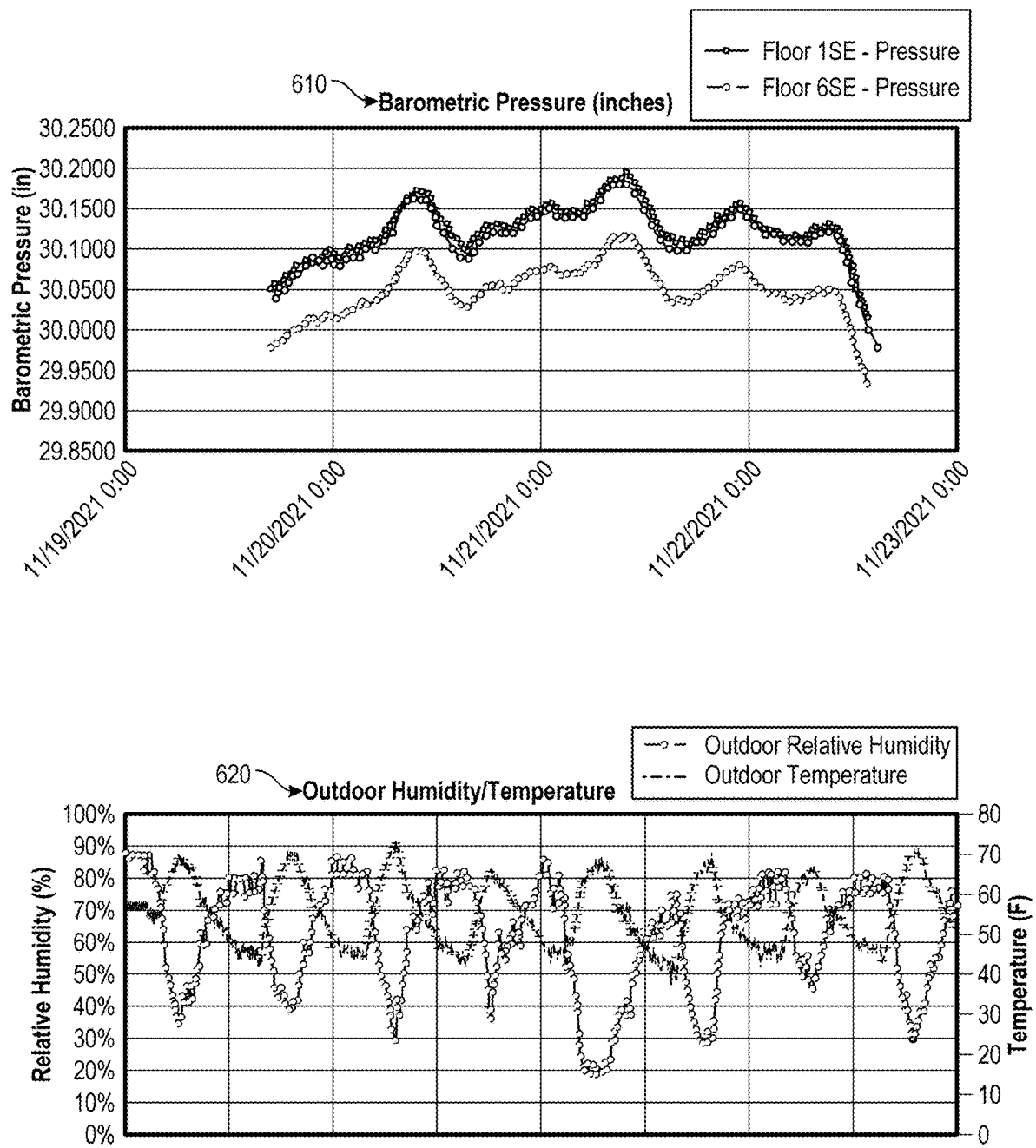
FIG. 6 illustrates sensor data at a third location over time, in accordance with some examples of the disclosure.
Figure 6:
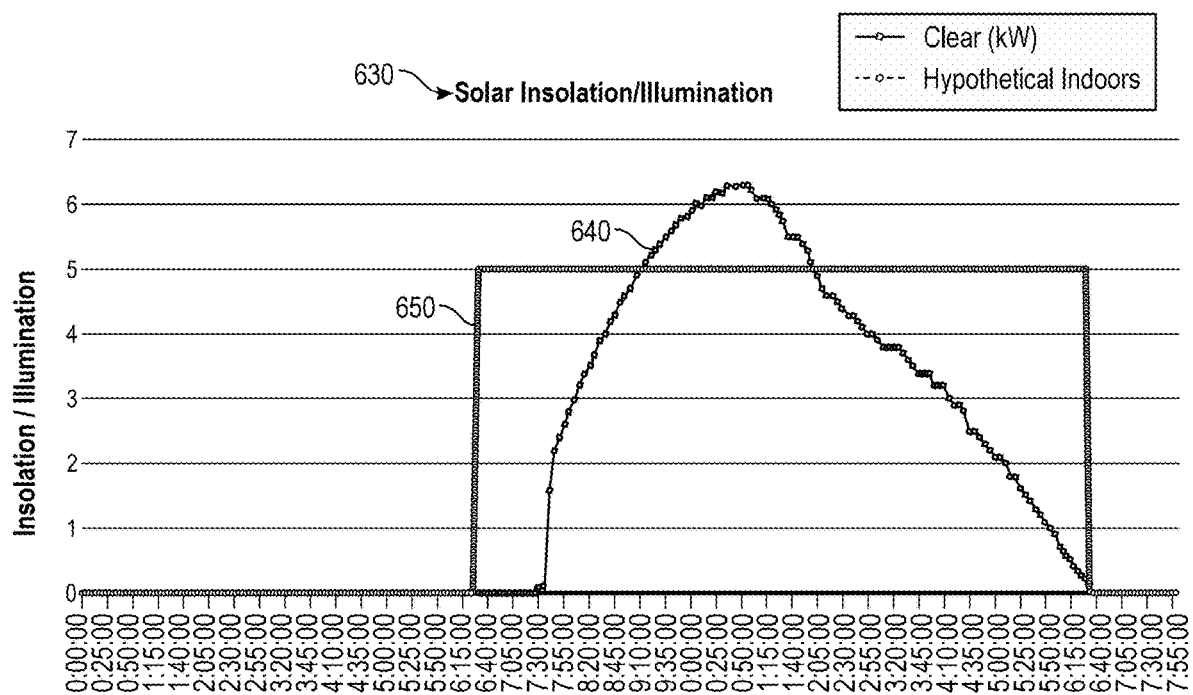

FIGS. 4-6 illustrate sensor data examples at one commercial office location over time, in accordance with some examples of the disclosure. Various sensor data are illustrated, including absolute temperature data 410 and relative humidity data 420 in FIG. 4 and barometric pressure 610, outdoor humidity and temperature 620, and solar insolation and illumination intensity 630 in FIG. 6.

Various sensor locations are illustrated in these charts. For example, an indoor sensor location generating first sensor data 430 (illustrated as temperature sensor data 430A and relative humidity data 430B) is located at the southeast corner inside of the building. The second sensor location generating second sensor data 440 (illustrated as temperature sensor data 440A and relative humidity data 440B) is located outside of the same building.

In these illustrations of FIG. 4, the sensor data determined by a computing device or sensor that is located outside (e.g., second sensor location generating second sensor data 440) may be characterized by patterns that repeat on a diurnal, monthly, and yearly basis. The amplitude of these changes (e.g., 40° temperature changes or 50% relative humidity changes) as well as their rate of change and the time at which the peaks and troughs occur can be used to construct rules or program pattern matching algorithms. In other words, the ML model rules associated with an outdoor location may be expected to be characterized by similar patterns that repeat on a time-dependent basis. The rules may be stored in sensor rule data store 118.

In some examples, the sensor data determined by a computing device or sensor that is located inside (e.g., first and second sensor locations that generate first sensor data 430 and second sensor data 440, respectively) may be characterized by patterns as well. For example, the sensor data may be relatively stable of the values both in relative amplitude and time of day reflecting both amplitude and time banding. The absolute magnitude of the mean characteristic may also correspond with a detectable pattern. Certain time-based patterns may be a characteristic of indoor environments, such as predictable warm/cool cycles on weekdays that are not present or not at as pronounced on weekends.

FIG. 5 illustrates environmental sensor data over a longer time period, in accordance with some examples of the disclosure. In this illustration, cyclical signals are collected and plotted. The first illustration 510 shows the cyclical patterns in comparing indoor and outdoor temperatures and second illustration 520 shows a zoomed in view of the same data that is illustrated in example 510 that reveals clear cyclical patterns in comparing indoor temperatures at different indoor locations 530 and 540. Outdoor location 550 shows the actual local temperature as measured by the local weather station collected over a public Internet database (e.g. third party datastore 142).

In some examples, this type of sensor feed varies cyclically within a time period (e.g., 24 hours). Each cycle may be different from the one before in amplitude and overall shape, and the pattern over a time period may be similar. The cyclical signals may vary at any value, including negative values, depending on the particular measurement system and units in use.

In both illustrations 510 and 520, the occupancy status of different floors affects the data. For example, the first elevation 530 may be occupied and have an HVAC system that targets the temperature to 73 degrees. The more rapid cycling of the data line may correspond with the HVAC system cooling the floor back to this value whenever it gets more than approximately 1 degree beyond the range. The second elevation 540 shows an unoccupied floor of the same building and has a relaxed target temperature of about 71 degrees. The HVAC behavior on this floor is different to save energy because it is unoccupied so it is not actively heated or cooled.

The second illustration 520 with a zoomed in Y axis reveals a clear cyclical pattern (e.g., roughly 6 cycles per day of roughly 4 hours each) that is not obvious from the wider view in 510. Each sensor in the first elevation 530 and second elevation 540 may correspond with a variance of 3% on either side of the mean, which may correspond with narrow, floating signatures. The third environment 550, collected from a fully outside sensor, may correspond with a wide, floating signature where there is a lot of variation in the environment.

Another type of environmental effect is amplitude banding, as illustrated by the colored horizontal boxes in FIG. 7. For example, fully enclosed buildings may provide controlled environments for the convenience and productivity of humans residing inside. Therefore, certain signals that may experience wide amplitude swings outdoors may be restricted to be within a fairly narrow band when measured indoors. Temperature and relative humidity are some examples.

Amplitude banding signals may differ from discontinuity loss signals in some respects. For example, the signal may be amplified indoors instead of attenuated, such as an HVAC system raising the temperature on a cold day. Second, the jitter in the amplitude may be confined to a narrow band depending on the function of the area. Some examples include: Indoor temperature for humans (e.g., 65-72 degrees and relative humidity between 30-60%), refrigerated storage (e.g., 35-55 degrees), and relative humidity (e.g., between 60-95% depending on items), and frozen storage (e.g., 14-32 degrees with high relative humidity between 90-95%). As compared with outdoor signals whose value generally "floats" or is unconstrained by these range values, the "banded" values can mean that the measurement is found in a specific expected sub-range. The precise band may be different for every building, but its minimum, maximum, and/or median can be discovered algorithmically (e.g., over a time period like a few days of observation).

Another type of environmental effect is time domain banding, which is also illustrated by the vertical grey boxes in FIG. 7. For example, commercial and residential buildings may have predictable occupancy schedules, which in turn can result in readily-discernable signatures in how sensor signals change over culturally established intervals (e.g., across a 24 hour cycle or 5 day work week). Residential structures may be occupied from late afternoon to early morning, while commercial buildings may support loose or tightly defined work shifts. These repeating patterns can form bands in the time domain.

In some examples, weekly and seasonal banding may also exist for some signals. For instance, commercial properties are often vacant on whatever days are considered the "weekend" in a given country, while conversely residential properties are heavily occupied on such days. On an annual basis, some signal patterns vary with time of year, such as solar irradiance, which varies substantially in both amplitude, onset time, peak time, and duration in the winter as opposed to the summer in each hemisphere. Both of these longer-term measurements can provide additional certainty to the indoor/outdoor estimate confidence.

FIG. 6 illustrates sensor data that corresponds with correlated movements of discrete values. In this illustration, barometric pressure data 610, outdoor humidity and temperature data 620, and solar insolation and illumination data 630 are provided over time. In these illustrations, note that the amplitude changes in the temperature and relative humidity (in example 620) have opposite phases, even though each conforms to the diurnal pattern. Computing device 102 in FIG. 1 (e.g., via ML model 114) may establish a higher confidence value or probability that the sensor was indoors or outdoors by identifying multiple signatures behaving in fashion expected of specific values (even in absence of any other data).

In some examples, the sensor data may correspond with uncorrelated movements of values. For example, the indoor and outdoor values may be substantially uncorrelated. Computing device 102 in FIG. 1 (e.g., via ML model 114) may initiate one or more data lookups of expected weather conditions in its area and would be capable of recognizing such differences between the environmental conditions determined by the computing device or sensors 132 and the environmental conditions in the database. Computing device 102 in FIG. 1 (e.g., via sensor monitor module 108) may compare the data sources of the two sensors and determine that the signatures of two values do not match, or initiate a numerical subtraction to create a new synthetic value that reflects a differential comparison. In some examples, the differential value may have its own data signature that may be meaningful for indoor/outdoor analysis.

In some examples, the sensor data may correspond with a computing device or sensor 132 geoposition to query a third-party data set for location comparison. For example, a computing device with internet access may be capable of determining its location to a very coarse level of accuracy (e.g., to a county or zip code level) and can query a plurality of data sets to assist in the analytical process. The publicly-available weather station (WX) data (e.g., third sensor location generating third sensor data 640) may only be available at the local density of station locations and/or the nearest airport.

In some examples, when a threshold amount of sensor data (e.g., three consecutive days) is received, the similarities and differences between the data sources and datatypes may be determined. In this illustration, barometric pressure (BP) is collected and plotted at illustration 610, which shows these similarities and differences over time.

When incorporating the barometric pressure or other additional sensor data with the confidence analysis, the computing device or sensor may be detected based on the location above ground level corresponding with the floor location in the building. In some locations, the air pressure drops at a rate of ~0.011 in Hg per 10 feet, which can be detected in the differences between sensor locations at different floors of the building. When the floor level is detected, computing device 102 in FIG. 1 (e.g., via ML model 114) can correlate the location above ground level as corresponding with a higher or lower confidence value of being fully indoors (e.g., reducing likelihood of being outdoors for common mid-rise or high-rise building types).

In example 630, one or more sensors may comprise an illumination or insolation meter and solar illumination or insolation data is generated. As shown by the first sensor data 640, the sensors can detect solar irradiance values that vary based on whether it is a clear day or a cloudy day, and a hypothetical indoor value using the amplitude of ambient light at the sensor. As with temperature readings, the shape of a measured curve over a period of time (e.g., 24 hour day or from month-to-month) could be determined, with the confidence value increasing over time from the ML model (e.g., via ML model 114) or reliability value of the particular sensors (e.g., via reliability value engine 112).

The actual solar illumination may be depicted on a predetermined time schedule (e.g., by hour). For contrast in example 630, a hypothetical office with a second sensor 650 is shown with employees arriving at 6:30 am and departing at 6:30 pm with constant amplitude. This may likely correspond with an indoor environment.

Other sensors may be implemented for similar conditions. For example, a sensor that is capable of analyzing the spectral signature of the light or color temperature may distinguish between natural sunlight and artificial indoor lights of various types as illustrated in FIG. 8.

In some examples, the attributes of uniformity and decay may apply indoors, but they mean different things. For example, a uniform indoor measurement may be a good indicator of a human-centric process, such as temperature or humidity being banded in both amplitude and time. Such bands should be roughly constant through a given facility with a single owner. By contrast, certain signals that may be uniform outside a building (e.g., GNSS L1/L5 signal power or solar irradiance) may decay indoors with increasing distance from the exterior walls. Both uniform and decaying signals indoors may be algorithmically meaningful techniques to help identify the environment of the device.

For indoor environments, there may not be a sensor signals that could definitively establish indoor state in a single reading or a few minutes of time. For example, a GNSS L1 or L5 signal that was 20 dB lower than the outdoor uniform level as in FIG. 2 could be the result of building envelope attenuation, but could be caused by other factors. A light spectrum or color temperature reading that was strongly indicative of artificial lighting does not on its own establish that a device is indoors. Nor does an outdoor spectrum necessarily perfectly guarantee one is outdoors as so called "full spectrum" indoor lights exist. An illustrative example of sensor data from artificial lighting is provided with FIG. 8.

Figure 9:
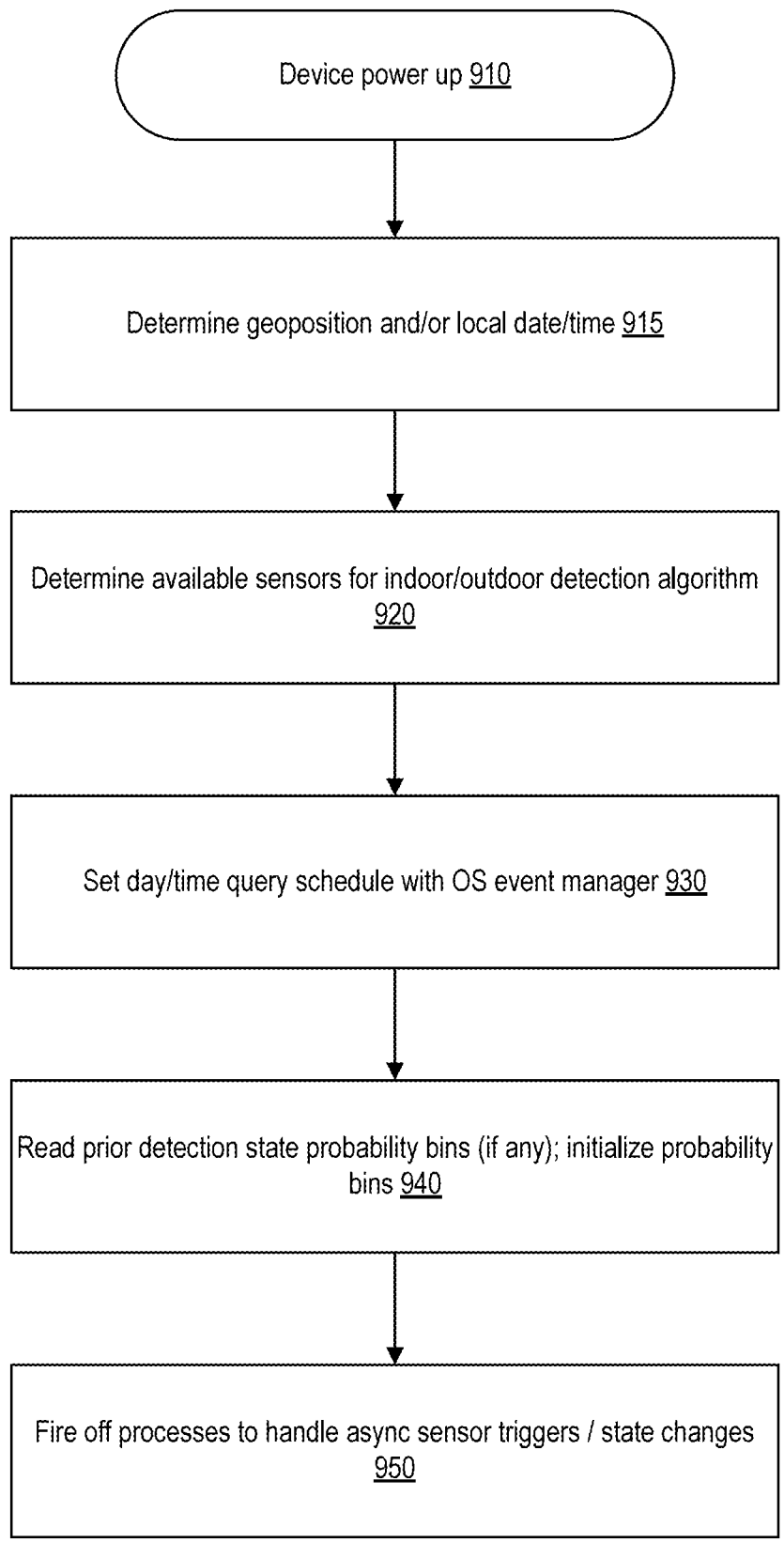
FIG. 9 illustrates a process flow for initializing sensor readings, in accordance with some examples of the disclosure.

FIG. 9 illustrates a process flow for initializing sensor readings, in accordance with some examples of the disclosure. Computing device 102 illustrated in FIG. 1 may implement the steps described herein. In some examples, the data collection may comprise sensor data from computing devices that are capable of being registered in the network.

At block 910, the computing device or sensor 132 may be powered on. In some examples, computing device 102 may transmit a signal to remotely turn on the computing device or sensor 132. In other examples, computing device or sensor 132 may be turned on at a predetermined time or manually.

In some examples, each of the computing devices or sensors 132 may be weighted from power up based on the manufacturer profile of the device. The profile may help provision specific indoor or outdoor determination rules as well. A specific combination of sensor type, sensor quality, or other factors may raise or lower the probability weights for the device.

At block 915, computing device 102 may determine the device's position (e.g., geoposition) and/or obtain a local date/time of the device.

At block 920, computing device 102 may determine available sensors for indoor or outdoor detection. In some examples, the device's geoposition and/or local date/time of the device may be provided as input parameters to determine the confidence value associated with the indoor or outdoor determination.

At block 930, computing device 102 may set a day/time query schedule with the operating system event manager.

At block 940, computing device 102 may read prior detection state probability bins and/or initialize probability bins.

At block 950, computing device 102 may fire off processes to handle asynchronous sensor triggers or state changes.

Figure 10:
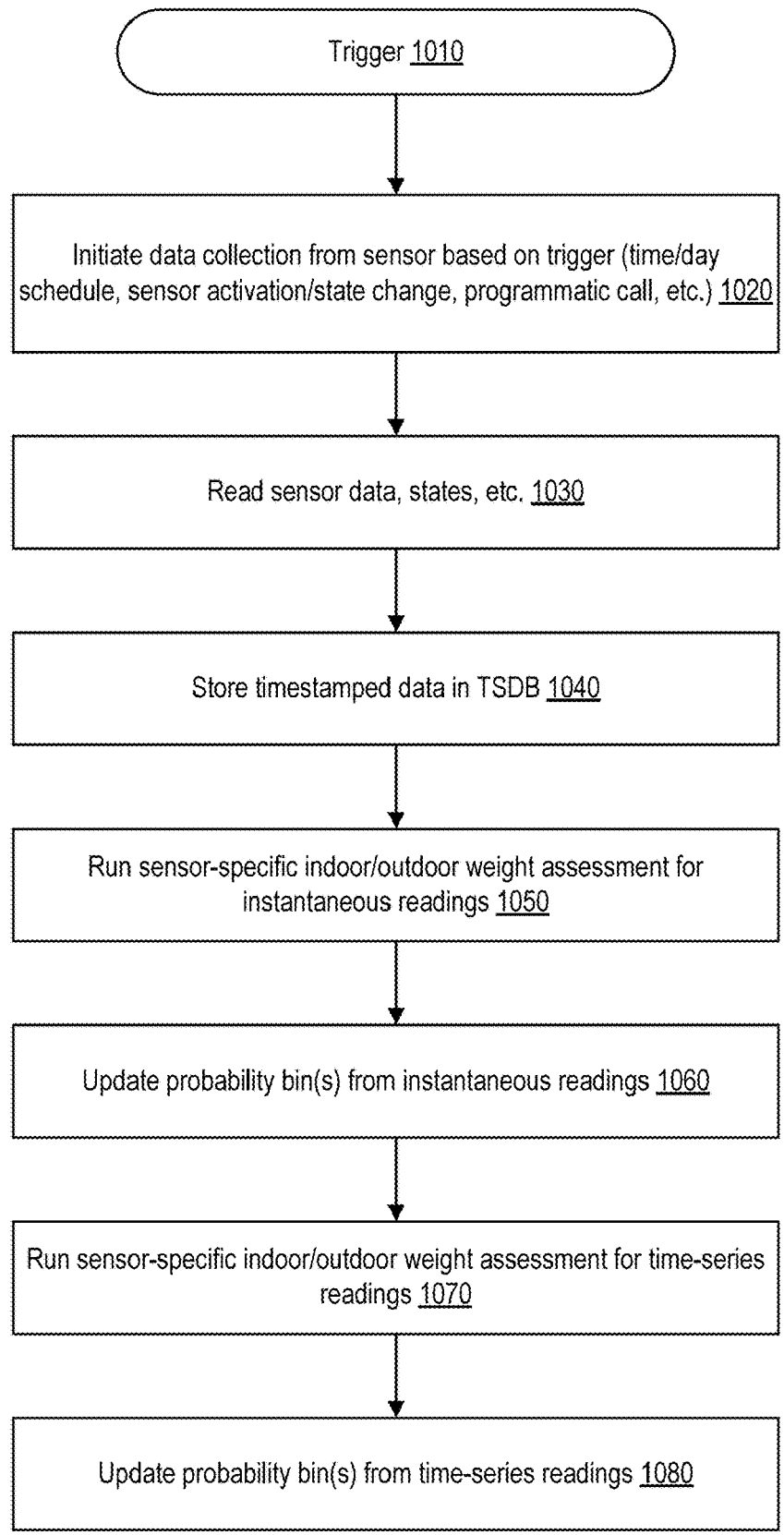
FIG. 10 illustrates a process flow for determining a confidence value over time, in accordance with some examples of the disclosure.

FIG. 10 illustrates a process flow for determining a confidence value over time, in accordance with some examples of the disclosure. In some examples, the confidence value may be determined without using a reliability value. Computing device 102 illustrated in FIG. 1 may implement the steps described herein in order to, for example, implement a discrete sensor trigger-based process.

In some examples, values of individual or multiple sensors may be compared with expected values. The expected values may be set by either known correlations, historical data, data from reference stations or databases, or other sources. If a predetermined threshold is exceeded or confidence values are increased or decreased, the system may implement additional data measurements. In some examples, the data measurements may also be triggered periodically or when certain values are expected to raise or lower confidence levels by facilitating comparisons with expected values at those times or under those conditions.

At block 1010, computing device 102 may receive a trigger. For example, the trigger may comprise a time or day schedule, a sensor activation or state change, or a programmatic call.

At block 1020, computing device 102 may initiate data collection from the sensor based on the trigger.

At block 1030, computing device 102 may read sensor data, states, or other information.

At block 1040, computing device 102 may store the timestamps sensor data in a time series database (TSDB), including time series data store 120. Computing device 102 may store various sensor log data in the TSDB.

At block 1050, computing device 102 may run sensor specific indoor or outdoor weight assessments for instantaneous readings.

At block 1060, computing device 102 may update probability bins from the instantaneous readings.

At block 1070, computing device 102 may run sensor specific indoor or outdoor weight assessments for the timeseries readings.

At block 1080, computing device 102 may update the probability bins from the timeseries readings.

In some examples, periodicity could vary based on feedback loops, time of day, day of week, or other factors that can continuously update indoor or outdoor probability bins over various time periods (e.g., 1 minute, 5 minutes, 30 minutes, 60 minutes, 4 hours, 12 hours, 24 hours, 7 days).

In some examples, computing device 102 may apply all sensor rules and weights for all sensor values to produce a cumulative inside or outside state determination in each bin.

In some examples, computing device 102 may fire off requests for additional sensor data or measurements by specific sensors for disambiguation (e.g., determined based on how computing device 102 is executing).

In some examples, computing device 102 may implement asynchronous and trigger-based (e.g., including scheduled readings) determination of an indoor or outdoor environment. Each trigger event may conclude with a "refresh" of the probability bins. This may imply that instead of an absolute value in each bin, that each trigger invocation adjusts a relative weighting of each bin based on new information. As a sample illustration, the "High Probability Outdoor" bin may be adjusted a little higher or a little lower each iteration loop, up to a maximum or minimum value. This process may not require elaborate if-then-else nested forests in machine executable instructions to try to capture all sensor combinations and values. Each trigger can adjust changed environmental characteristics, as needed. The ML model may converge progressively over time to a stable set of bins that is more or less unchanged.

It should be noted that the terms "optimize," "optimal" and the like as used herein can be used to mean making or achieving performance as effective or perfect as possible. However, as one of ordinary skill in the art reading this document will recognize, perfection cannot always be achieved. Accordingly, these terms can also encompass making or achieving performance as good or effective as possible or practical under the given circumstances, or making or achieving performance better than that which can be achieved with other settings or parameters.

Figure 11:
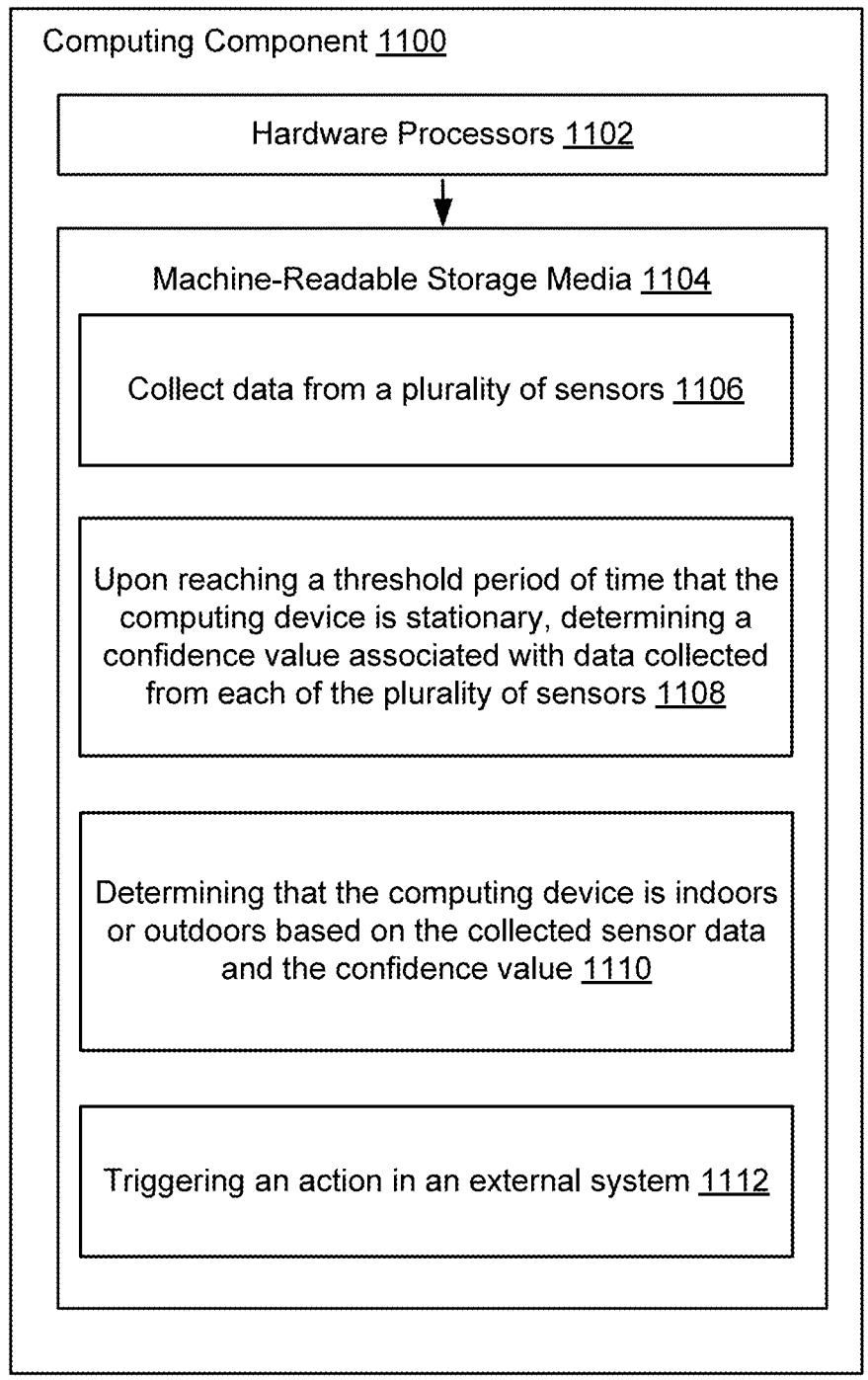
FIG. 11 is an example computing component that may be used to implement various features of embodiments described in the present disclosure.

FIG. 11 illustrates an example computing component that may be used to deterministically estimate whether the location of a computing device that is fixed or movable is inside a fully enclosed building or not (e.g., fully or partially indoors/outdoors) in accordance with various embodiments. Referring now to FIG. 11, computing component 1100 may be, for example, a server computer, a controller, or any other similar computing component capable of processing data. In the example implementation of FIG. 11, the computing component 1100 includes a hardware processor 1102, and machine-readable storage medium for 1104.

Hardware processor 1102 may be one or more central processing units (CPUs), semiconductor-based microprocessors, and/or other hardware devices suitable for retrieval and execution of instructions stored in machine-readable storage medium 1104. Hardware processor 1102 may fetch, decode, and execute instructions, such as instructions 1106-1112, to control processes or operations for deterministically estimating whether the location of a computing device that is fixed or movable is inside a fully enclosed building or not (e.g., fully or partially indoors/outdoors). As an alternative or in addition to retrieving and executing instructions, hardware processor 1102 may include one or more electronic circuits that include electronic components for performing the functionality of one or more instructions, such as a field programmable gate array (FPGA), application specific integrated circuit (ASIC), or other electronic circuits.

A machine-readable storage medium, such as machine-readable storage medium 1104, may be any electronic, magnetic, optical, or other physical storage device that contains or stores executable instructions. Thus, machine-readable storage medium 1104 may be, for example, Random Access Memory (RAM), non-volatile RAM (NVRAM), an Electrically Erasable Programmable Read-Only Memory (EEPROM), a storage device, an optical disc, and the like. In some embodiments, machine-readable storage medium 1104 may be a non-transitory storage medium, where the term "non-transitory" does not encompass transitory propagating signals. As described in detail below, machine-readable storage medium 1004 may be encoded with executable instructions, for example, instructions 1106-1112.

Hardware processor 1102 may execute instruction 1106 to collect data from a plurality of sensors associated with the computing device.

Hardware processor 1102 may execute instruction 1108 to determine a confidence value associated with data collected from each of the plurality of sensors. For example, upon reaching a threshold period of time that the computing device is stationary, the confidence value may be determined.

Hardware processor 1102 may execute instruction 1110 to determine that the computing device is indoors or outdoors based on the collected sensor data and the confidence value. The collected sensor data with a low confidence level may not be used to determine if the portable device is indoors or outdoors.

Hardware processor 1102 may execute instruction 1112 to provide the determination that the computing device is indoors or outdoors and trigger an action in an external system.

Figure 12:
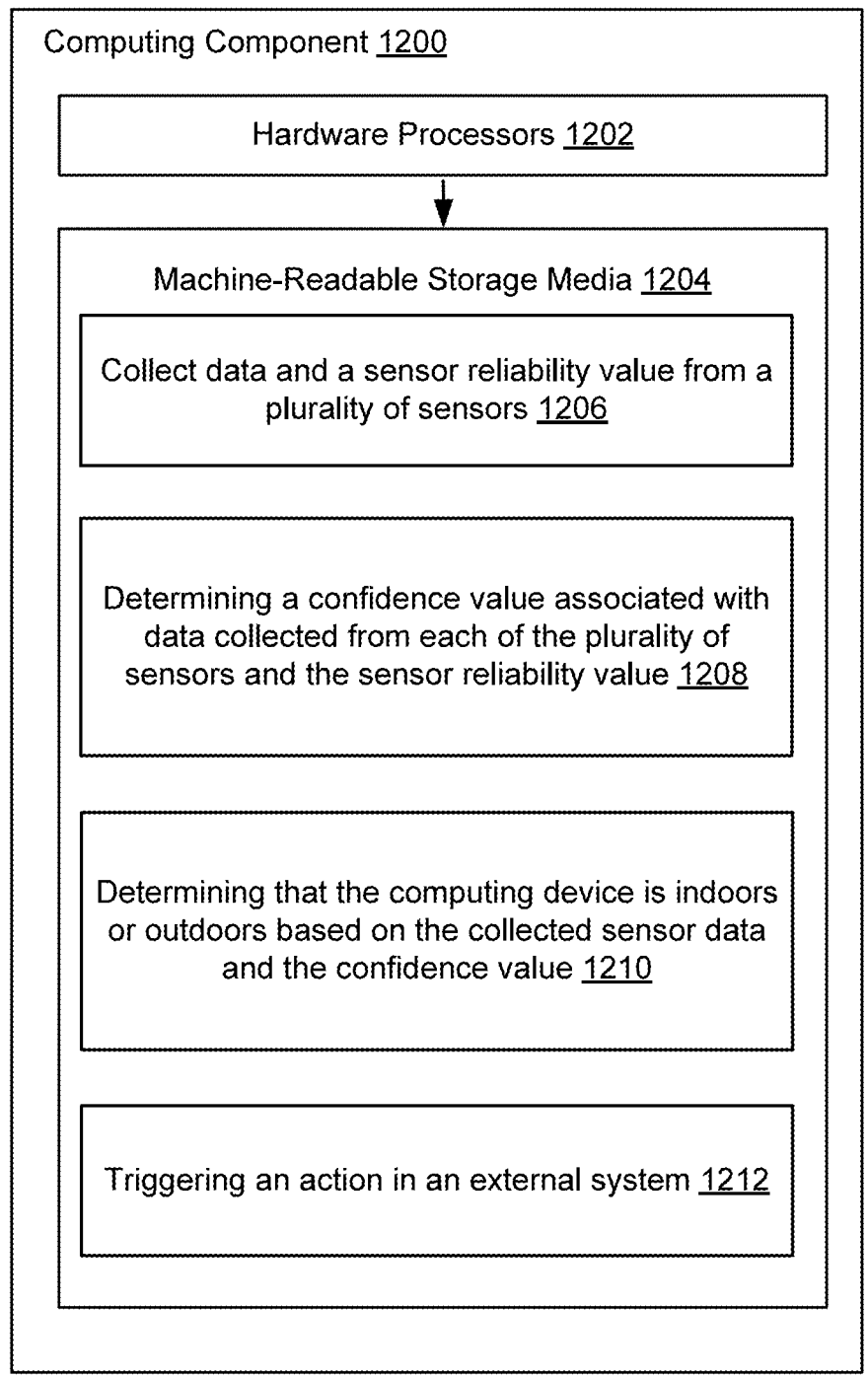
FIG. 12 is an example computing component that may be used to implement various features of embodiments described in the present disclosure.

FIG. 12 illustrates an example computing component that may be used to deterministically estimate whether the location of a computing device that is fixed or movable is inside a fully enclosed building or not (e.g., fully or partially indoors/outdoors) in accordance with various embodiments. Referring now to FIG. 12, computing component 1200 may be, for example, a server computer, a controller, or any other similar computing component capable of processing data. In the example implementation of FIG. 12, the computing component 1200 includes a hardware processor 1202, and machine-readable storage medium for 1204.

Hardware processor 1202 may be one or more central processing units (CPUs), semiconductor-based microprocessors, and/or other hardware devices suitable for retrieval and execution of instructions stored in machine-readable storage medium 1204. Hardware processor 1202 may fetch, decode, and execute instructions, such as instructions 1206-1212, to control processes or operations for deterministically estimating whether the location of a computing device that is fixed or movable is inside a fully enclosed building or not (e.g., fully or partially indoors/outdoors). As an alternative or in addition to retrieving and executing instructions, hardware processor 1202 may include one or more electronic circuits that include electronic components for performing the functionality of one or more instructions, such as a field programmable gate array (FPGA), application specific integrated circuit (ASIC), or other electronic circuits.

A machine-readable storage medium, such as machine-readable storage medium 1204, may be any electronic, magnetic, optical, or other physical storage device that contains or stores executable instructions. Thus, machine-readable storage medium 1204 may be, for example, Random Access Memory (RAM), non-volatile RAM (NVRAM), an Electrically Erasable Programmable Read-Only Memory (EEPROM), a storage device, an optical disc, and the like. In some embodiments, machine-readable storage medium 1204 may be a non-transitory storage medium, where the term "non-transitory" does not encompass transitory propagating signals. As described in detail below, machine-readable storage medium 1204 may be encoded with executable instructions, for example, instructions 1206-1212.

Hardware processor 1202 may execute instruction 1206 to collect data and a sensor reliability value from a plurality of sensors associated with the computing device.

Hardware processor 1202 may execute instruction 1208 to determine a confidence value associated with data collected from each of the plurality of sensors. The confidence value may be determined based on the sensor reliability value for the corresponding sensor from the plurality of sensors.

Hardware processor 1202 may execute instruction 1210 to determine that the computing device is indoors or outdoors based on the collected sensor data and the confidence value. The collected sensor data with a low confidence level may not be used to determine if the portable device is indoors or outdoors.

Figure 13:
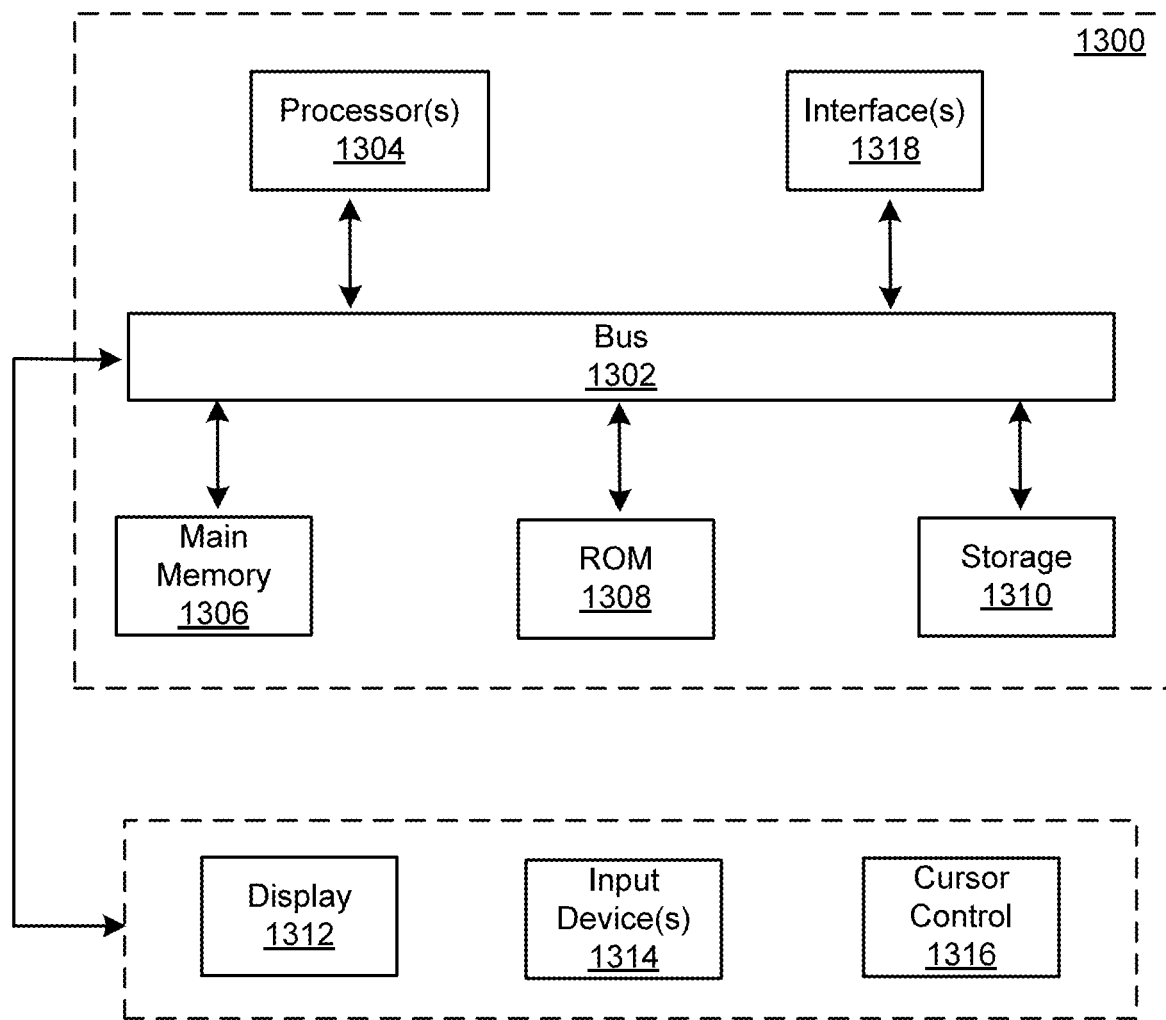
FIG. 13 depicts a block diagram of an example computer system in which various of the embodiments described herein may be implemented.

Hardware processor 1202 may execute instruction 1212 to provide the determination that the computing device is indoors or outdoors and trigger an action in an external system FIG. 13 depicts a block diagram of an example computer system 1300 in which various of the embodiments described herein may be implemented. The computer system 1300 includes a bus 1302 or other communication mechanism for communicating information, one or more hardware processors 1304 coupled with bus 1302 for processing information. Hardware processor(s) 1304 may be, for example, one or more general purpose microprocessors.

The computer system 1300 also includes a main memory 1306, such as a random access memory (RAM), cache and/or other dynamic storage devices, coupled to bus 1302 for storing information and instructions to be executed by processor 1304. Main memory 1306 also may be used for storing temporary variables or other intermediate information during execution of instructions to be executed by processor 1304. Such instructions, when stored in storage media accessible to processor 1304, render computer system 1300 into a special-purpose machine that is customized to perform the operations specified in the instructions.

The computer system 1300 further includes a read only memory (ROM) 1308 or other static storage device coupled to bus 1302 for storing static information and instructions for processor 1304. A storage device 1310, such as a magnetic disk, optical disk, or USB thumb drive (Flash drive), etc., is provided and coupled to bus 1302 for storing information and instructions.

The computer system 1300 may be coupled via bus 1302 to a display 1312, such as a liquid crystal display (LCD) (or touch screen), for displaying information to a computer user. An input device 1314, including alphanumeric and other keys, is coupled to bus 1302 for communicating information and command selections to processor 1304. Another type of user input device is cursor control 1316, such as a mouse, a trackball, or cursor direction keys for communicating direction information and command selections to processor 1304 and for controlling cursor movement on display 1312. In some embodiments, the same direction information and command selections as cursor control may be implemented via receiving touches on a touch screen without a cursor.

The computing system 1300 may include a user interface module to implement a GUI that may be stored in a mass storage device as executable software codes that are executed by the computing device(s). This and other modules may include, by way of example, components, such as software components, object-oriented software components, class components and task components, processes, functions, attributes, procedures, subroutines, segments of program code, drivers, firmware, microcode, circuitry, data, databases, data structures, tables, arrays, and variables.

In general, the word "component," "engine," "system," "database," data store," and the like, as used herein, can refer to logic embodied in hardware or firmware, or to a collection of software instructions, possibly having entry and exit points, written in a programming language, such as, for example, Java, C or C++. A software component may be compiled and linked into an executable program, installed in a dynamic link library, or may be written in an interpreted programming language such as, for example, BASIC, Perl, or Python. It will be appreciated that software components may be callable from other components or from themselves, and/or may be invoked in response to detected events or interrupts. Software components configured for execution on computing devices may be provided on a computer readable medium, such as a compact disc, digital video disc, flash drive, magnetic disc, or any other tangible medium, or as a digital download (and may be originally stored in a compressed or installable format that requires installation, decompression or decryption prior to execution). Such software code may be stored, partially or fully, on a memory device of the executing computing device, for execution by the computing device. Software instructions may be embedded in firmware, such as an EPROM. It will be further appreciated that hardware components may be comprised of connected logic units, such as gates and flip-flops, and/or may be comprised of programmable units, such as programmable gate arrays or processors.

The computer system 1300 may implement the techniques described herein using customized hard-wired logic, one or more ASICs or FPGAs, firmware and/or program logic which in combination with the computer system causes or programs computer system 1300 to be a special-purpose machine. According to one embodiment, the techniques herein are performed by computer system 1300 in response to processor(s) 1304 executing one or more sequences of one or more instructions contained in main memory 1306. Such instructions may be read into main memory 1306 from another storage medium, such as storage device 1310. Execution of the sequences of instructions contained in main memory 1306 causes processor(s) 1304 to perform the process steps described herein. In alternative embodiments, hard-wired circuitry may be used in place of or in combination with software instructions.

The term "non-transitory media," and similar terms, as used herein refers to any media that store data and/or instructions that cause a machine to operate in a specific fashion. Such non-transitory media may comprise non-volatile media and/or volatile media. Non-volatile media includes, for example, optical or magnetic disks, such as storage device 1310. Volatile media includes dynamic memory, such as main memory 1306. Common forms of non-transitory media include, for example, a floppy disk, a flexible disk, hard disk, solid state drive, magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge, and networked versions of the same.

Non-transitory media is distinct from but may be used in conjunction with transmission media. Transmission media participates in transferring information between non-transitory media. For example, transmission media includes coaxial cables, copper wire and fiber optics, including the wires that comprise bus 1302. Transmission media can also take the form of acoustic or light waves, such as those generated during radio-wave and infra-red data communications.

The computer system 1300 also includes a communication interface 1318 coupled to bus 1302. Communication interface 1318 provides a two-way data communication coupling to one or more network links that are connected to one or more local networks. For example, communication interface 1318 may be an integrated services digital network (ISDN) card, cable modem, satellite modem, or a modem to provide a data communication connection to a corresponding type of telephone line. As another example, communication interface 1318 may be a local area network (LAN) card to provide a data communication connection to a compatible LAN (or WAN component to communicated with a WAN). Wireless links may also be implemented. In any such implementation, communication interface 1318 sends and receives electrical, electromagnetic or optical signals that carry digital data streams representing various types of information.

A network link typically provides data communication through one or more networks to other data devices. For example, a network link may provide a connection through local network to a host computer or to data equipment operated by an Internet Service Provider (ISP). The ISP in turn provides data communication services through the world wide packet data communication network now commonly referred to as the "Internet." Local network and Internet both use electrical, electromagnetic or optical signals that carry digital data streams. The signals through the various networks and the signals on network link and through communication interface 1318, which carry the digital data to and from computer system 1300, are example forms of transmission media.

The computer system 1300 can send messages and receive data, including program code, through the network (s), network link and communication interface 1318. In the Internet example, a server might transmit a requested code for an application program through the Internet, the ISP, the local network and the communication interface 1318.

The received code may be executed by processor 1304 as it is received, and/or stored in storage device 1310, or other non-volatile storage for later execution.

Each of the processes, methods, and algorithms described in the preceding sections may be embodied in, and fully or partially automated by, code components executed by one or more computer systems or computer processors comprising computer hardware. The one or more computer systems or computer processors may also operate to support performance of the relevant operations in a "cloud computing" environment or as a "software as a service" (SaaS). The processes and algorithms may be implemented partially or wholly in application-specific circuitry. The various features and processes described above may be used independently of one another, or may be combined in various ways. Different combinations and sub-combinations are intended to fall within the scope of this disclosure, and certain method or process blocks may be omitted in some implementations.

The methods and processes described herein are also not limited to any particular sequence, and the blocks or states relating thereto can be performed in other sequences that are appropriate, or may be performed in parallel, or in some other manner. Blocks or states may be added to or removed from the disclosed example embodiments. The performance of certain of the operations or processes may be distributed among computer systems or computers processors, not only residing within a single machine, but deployed across a number of machines.

As used herein, a circuit might be implemented utilizing any form of hardware, software, or a combination thereof. For example, one or more processors, controllers, ASICs, PLAS, PALs, CPLDs, FPGAs, logical components, software routines or other mechanisms might be implemented to make up a circuit. In implementation, the various circuits described herein might be implemented as discrete circuits or the functions and features described can be shared in part or in total among one or more circuits. Even though various features or elements of functionality may be individually described or claimed as separate circuits, these features and functionality can be shared among one or more common circuits, and such description shall not require or imply that separate circuits are required to implement such features or functionality. Where a circuit is implemented in whole or in part using software, such software can be implemented to operate with a computing or processing system capable of carrying out the functionality described with respect thereto, such as computer system 1300.

As used herein, the term "or" may be construed in either an inclusive or exclusive sense. Moreover, the description of resources, operations, or structures in the singular shall not be read to exclude the plural. Conditional language, such as, among others, "can," "could," "might," or "may," unless specifically stated otherwise, or otherwise understood within the context as used, is generally intended to convey that certain embodiments include, while other embodiments do not include, certain features, elements and/or steps.

Terms and phrases used in this document, and variations thereof, unless otherwise expressly stated, should be construed as open ended as opposed to limiting. Adjectives such as "conventional," "traditional," "existing," "normal," "standard," "known," and terms of similar meaning should not be construed as limiting the item described to a given time period or to an item available as of a given time, but instead should be read to encompass conventional, traditional, existing, normal, or standard technologies that may be available or known now or at any time in the future. The presence of broadening words and phrases such as "one or more," "at least," "but not limited to" or other like phrases in some instances shall not be read to mean that the narrower case is intended or required in instances where such broadening phrases may be absent.

What is claimed is:

1. A computer-implemented method, comprising:
   receiving sensor data regarding a computing device from sensors associated with the computing device;
   storing the received sensor data as time series data at the computing device;
   determine based on the time series data, a likelihood that the computing device and sensors are at a predicted location that is either fully indoors, partially indoors, fully outdoors, or partially outdoors;
   generate and store one or more sensor rules based on the time series data for adjusting a confidence value regarding the predicted location of the computing device and the sensors;

providing a determination that the computing device and the sensors are at the predicated location in accordance with an adjusted confidence value, and triggering an action based on the predicted location of the computing device and the sensors.

2. The computer-implemented method of claim 1, wherein the computing device and the sensors associated with the computing device are co-located.

3. The computer-implemented method of claim 1, wherein the sensor data is received with time stamp, the sensor data in combination with the time stamp comprising the time series data.

4. The computer-implemented method of claim 1, wherein the determined likelihood comprises a probability value.

5. The computer-implemented method of claim 1, wherein determining the likelihood that the computing device and sensors are at the predicted location comprises performing, on the sensor data, at least one of comparison-based sensor data analytics, pattern recognition, linear programming, or a machine learning model.

6. The computer-implemented method of claim 5, wherein the machine learning model assigns weights to each type of sensor data that are one of correlated or convolved with one another.

7. The computer-implemented method of claim 1, wherein the determination of the likelihood that the computing device and sensors are at a predicted location is performed within a specified timeframe.

8. The computer-implemented method of claim 7, wherein the machine learning model identifies a deterministic relationship between a particular sensor of the sensors associated with the computing device and the determined predicted location.

9. The computer-implemented method of claim 1, wherein the sensor data reflects one of an absence of expected data, observation of data crossing single or multiple staged thresholds, observation of changes in the data over time, observation of aggregated state patterns over recurring time intervals, observation of changes in data suggesting movement of the computer device and the sensors.

10. The computer-implemented method of claim 1, wherein the one or more sensor rules for adjusting the confidence value adjust the confidence value based on an external system's characterization of indoor and outdoor environments.

11. A computing device, comprising:
a memory; and
one or more processors that are configured to execute machine readable instructions stored in the memory to:
receive sensor data regarding the computing device from sensors co-located with the computing device;
estimate a location of the computing device as being one of fully indoors, partially indoors, fully outdoors, or partially outdoors based on a probability calculated from the sensor data with an associated confidence value;
based on a location estimate with a sufficiently dispositive confidence value, providing a determination that the computing device is at the estimated location, and triggering an action based on the estimated location of the computing device.

12. The computing device of claim 11, wherein estimating the location of the computing device comprises performing, on the sensor data, at least one of comparison-based sensor data analytics, pattern recognition, linear programming, or a machine learning model.

13. The computing device of claim 11, wherein the one or more processors executing the estimating of the location of the computing device executes further machine readable instructions stored in the memory to determine whether to recalculate the estimated location and the confidence value in response to movement of the computing device or an adjustment of an environment of the computing device in real-time.

14. The computing device of claim 13, wherein the machine learning model assigns weights to each type of sensor data that are one of correlated or convolved with one another.

15. The computing device of claim 11, wherein the sufficiently dispositive confidence value comprises a confidence value exceeding or falling below a defined threshold.

16. The computing device of claim 15, wherein the machine learning model identifies a deterministic relationship between a particular sensor of the sensors co-located with the computing device and the estimated location.

17. The computing device of claim 11, wherein the sensor data reflects one of an absence of expected data, observation of data crossing single or multiple staged thresholds, observation of changes in the data over time, observation of aggregated state patterns over recurring time intervals, observation of changes in data suggesting movement of the computer device and the sensors.

18. The computing device of claim 11, wherein the one or more processors execute further machine readable instructions stored in the memory to generate and store one or more sensor rules based on the sensor data for adjusting the confidence value.

19. The computing device of claim 18, wherein the one or more sensor rules for adjusting the confidence value adjust the confidence value based on an external system's characterization of indoor and outdoor environments.

20. The computing device of claim 11, wherein the one or more processors execute further machine readable instructions stored in the memory to convert the sensor data into recognizable data signatures.

* * * * *